(12) United States Patent
Yamaguchi et al.

(10) Patent No.: US 7,577,271 B2
(45) Date of Patent: Aug. 18, 2009

(54) IMAGE PROCESSING APPARATUS FOR EMBEDDING DIGITAL WATERMARK

(75) Inventors: Takashi Yamaguchi, Kawasaki (JP); Shinya Tokuda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 941 days.

(21) Appl. No.: 11/014,206

(22) Filed: Dec. 17, 2004

(65) Prior Publication Data

US 2005/0134622 A1  Jun. 23, 2005

(30) Foreign Application Priority Data

Dec. 22, 2003 (JP) .............................. 2003-424329

(51) Int. Cl.
*G06K 9/00* (2006.01)
(52) U.S. Cl. ....................... 382/100; 382/162; 382/165; 382/167; 358/3.28
(58) Field of Classification Search ................ 358/3.28; 382/100, 162–167, 232; 713/176
See application file for complete search history.

(56) References Cited

U.S. PATENT DOCUMENTS

| | | | | |
|---|---|---|---|---|
| 5,946,414 | A * | 8/1999 | Cass et al. ................. | 382/183 |
| 6,175,639 | B1 * | 1/2001 | Satoh et al. ................ | 382/100 |
| 6,438,251 | B1 | 8/2002 | Yamaguchi | |
| 6,826,291 | B2 * | 11/2004 | Yoshiura et al. ............ | 382/100 |
| 7,130,442 | B2 * | 10/2006 | Braudaway et al. ......... | 382/100 |
| 7,197,161 | B2 * | 3/2007 | Fan ............................ | 382/100 |
| 7,245,740 | B2 * | 7/2007 | Suzaki ....................... | 382/100 |
| 7,298,865 | B2 * | 11/2007 | Lubin et al. ................. | 382/100 |
| 2001/0030759 | A1 * | 10/2001 | Hayashi et al. ............. | 358/1.9 |
| 2001/0040980 | A1 | 11/2001 | Yamaguchi | |
| 2002/0002679 | A1 * | 1/2002 | Murakami et al. .......... | 713/176 |
| 2002/0181025 | A1 * | 12/2002 | Yamaguchi ................. | 358/3.28 |
| 2003/0202680 | A1 * | 10/2003 | Hayashi ...................... | 382/100 |
| 2003/0210803 | A1 * | 11/2003 | Kaneda et al. .............. | 382/100 |
| 2004/0017926 | A1 * | 1/2004 | Tonisson .................... | 382/100 |
| 2004/0120546 | A1 * | 6/2004 | Yoshiura et al. ............. | 382/100 |
| 2004/0121131 | A1 | 6/2004 | Yamaguchi et al. | |

(Continued)

FOREIGN PATENT DOCUMENTS

JP            6-59739         3/1994

(Continued)

OTHER PUBLICATIONS

European Search Report dated Feb. 26, 2007 for Appln. No. 04030177.2-2218.

(Continued)

*Primary Examiner*—Samir A. Ahmed
*Assistant Examiner*—Li Liu
(74) *Attorney, Agent, or Firm*—Pillsbury Winthrop Shaw Pittman, LLP

(57) ABSTRACT

An image processing apparatus corrects color-difference amounts of main image information by a plurality of color-difference amount correction processes and performs a plurality of color-difference modulation processes based on the processing results of the plurality of color-difference amount correction processes and a plurality of key information items. Further, it subjects the processing results of the plurality of color-difference modulation processes to the selecting/synthesizing process based on sub-information and superposing the processing result of the selecting/synthesizing process on the main image information to form synthesized image information having sub-information embedded in an invisible state in the main image information.

14 Claims, 19 Drawing Sheets

U.S. PATENT DOCUMENTS

2004/0215965 A1   10/2004   Tokuda et al.

FOREIGN PATENT DOCUMENTS

| JP | 9-248935 | 9/1997 |
| JP | 2001-268346 | 9/2001 |
| JP | 2003-025728 | 1/2003 |
| JP | 2003-115990 | 4/2003 |

OTHER PUBLICATIONS

Rudaz N et al.; "Protecting Identity Documents with a Just Noticeable Microstructure"; Proceeding of Spie, Spie, Bellingham, VA, US, vol. 4677, 2002, pp. 101-109, XP009077797, ISSN:0277-786X.

Fleet D. J. et al.; "Embedding Invisible Information in Color Images", Proceedings of the International Conference on Image Processing, ICIP 1997; Santa Barbara, CA, Oct. 26-29, 1997, Los Alamitos, Ca: IEEE, US, vol. 1, Oct. 1997, pp. 532-535, XP 000668947; ISBN: 0-8186-8184-5.

Hee-Soo Kim et al., "Digital watermarking based on color differences" Proceedings of Spie- The International Society for Optical Engineering Spie-Int. Soc. Opt. Eng USA, vol. 4314, 2001. pp. 10-17; XP002417067; ISSN 0177-786X.

Xiaoqiang Li et al; "Multi-channel Data Hiding Scheme For Color Images"; Information Technology; Coding and Computing Computers and Communications 2003. Proceeding, ITCC 2003; International Conference on Apr. 28-30, 2003. Piscataway, NJ, USA, IEEE, Apr. 28, 2003, pp. 569-573; XP 010368682; ISBN: 0-7695-1916-4.

Japanese Office Action dated May 7, 2008 for Application No. 2003-424329.

European Search Report dated May 28, 2008 for Appln. No. 04030177.2-2218.

Wan Adnan W et al., "A review of image watermarking", Student Conference on Research and Development Scored 2003, Aug. 25-26, 2003, Putrajaya, Malaysia, pp. 381-384, XP010812285.

Li X, et al., "Robust Spatial Data Hiding for Color Images", Int. Conf. on Communications and Multimedia Security, Oct. 2, 2003, pp. 205-213, XP009077923, Torino, Italy.

\* cited by examiner

| Bit plane of sub (image) information | Selection of key information (value of sub (image) information is "0") | Selection of key information (value of sub (image) information is "1") |
|---|---|---|
| 7 | First key information | Second key information |
| 6 | Third key information | Fourth key information |
| ... | ... | ... |
| 1 | Thirteenth key information | Fourteenth key information |
| 0 | Fifteenth key information | Sixteenth key information |

FIG. 17

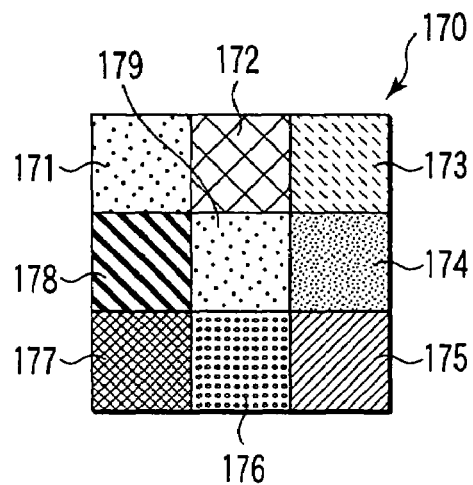

FIG. 18

| Representation value of sub (image) information | Selection of key information |
|---|---|
| 0 | First key information |
| 1 | Second key information |
| ... | ... |
| 244 | 255th key information |
| 255 | 256th key information |
FIG. 19
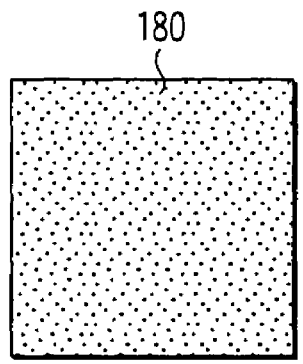
FIG. 20
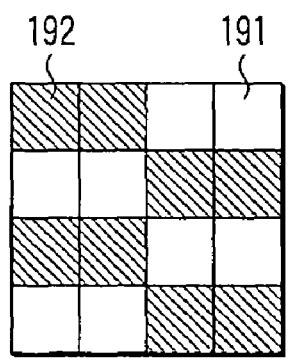
FIG. 21

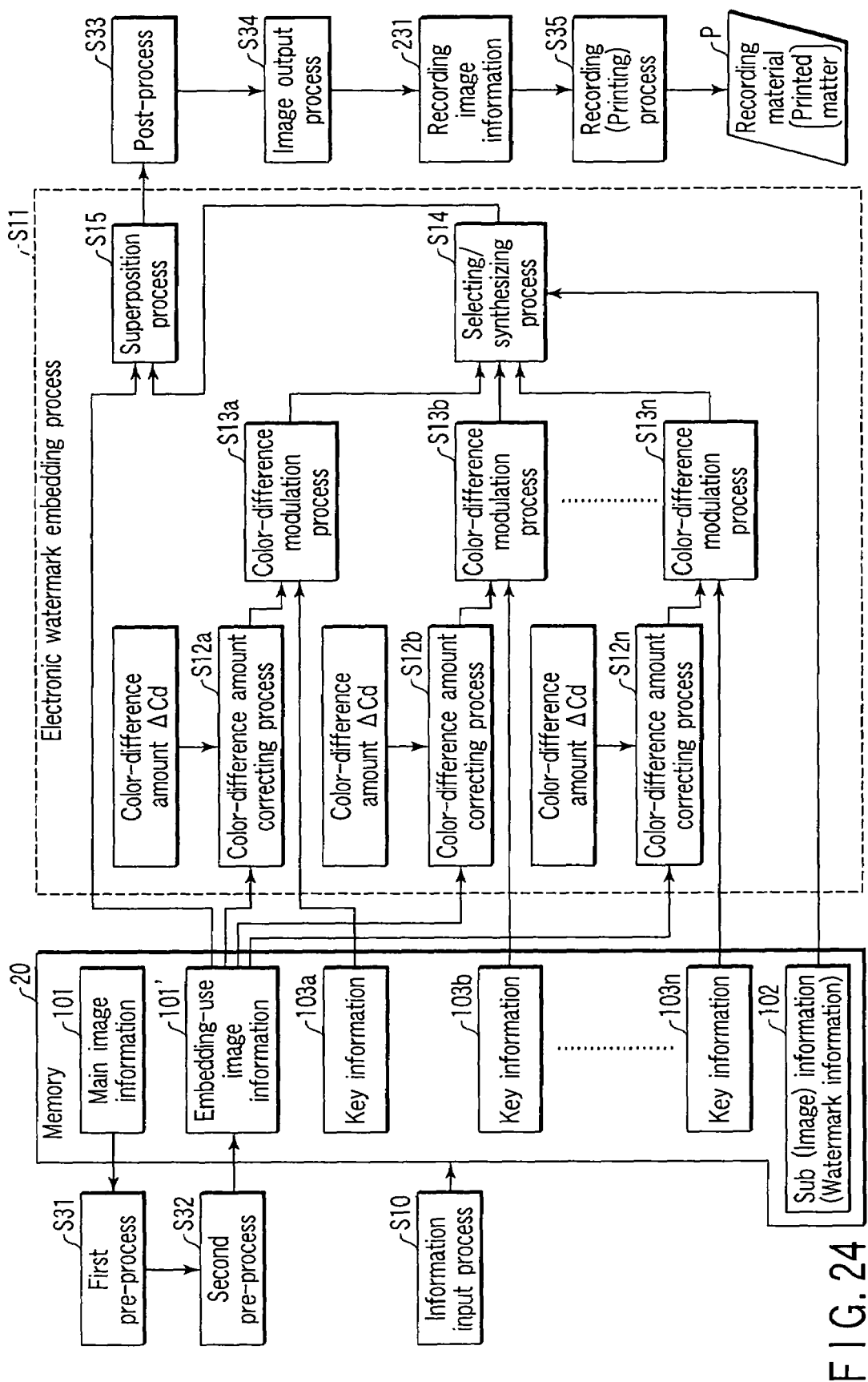
F I G. 24

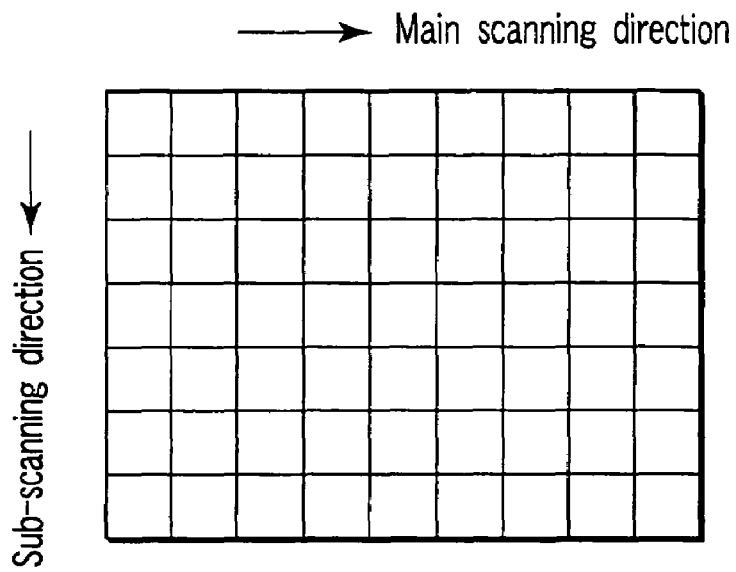
F I G. 27
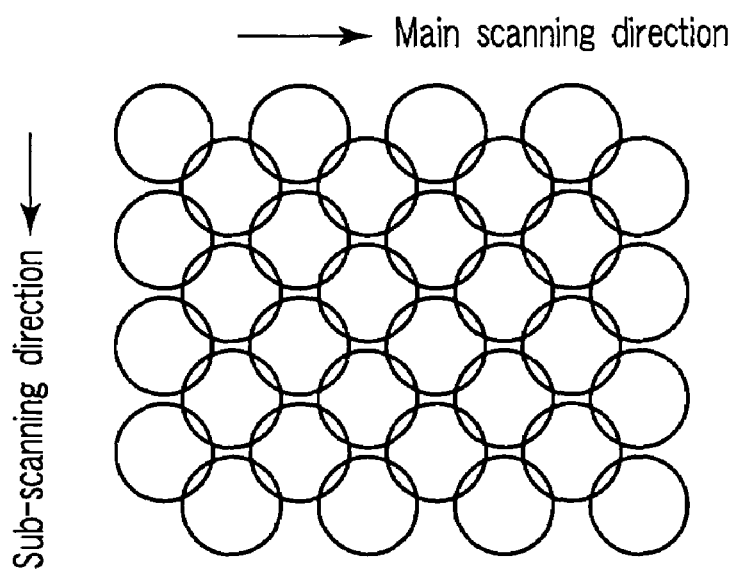
F I G. 28

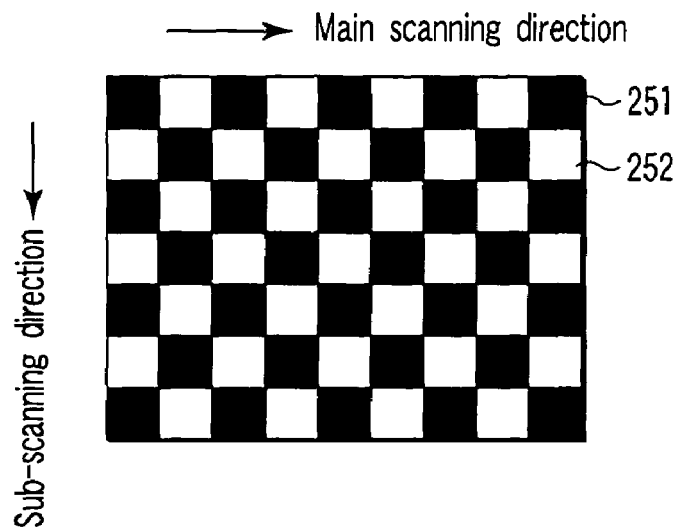
F I G. 29
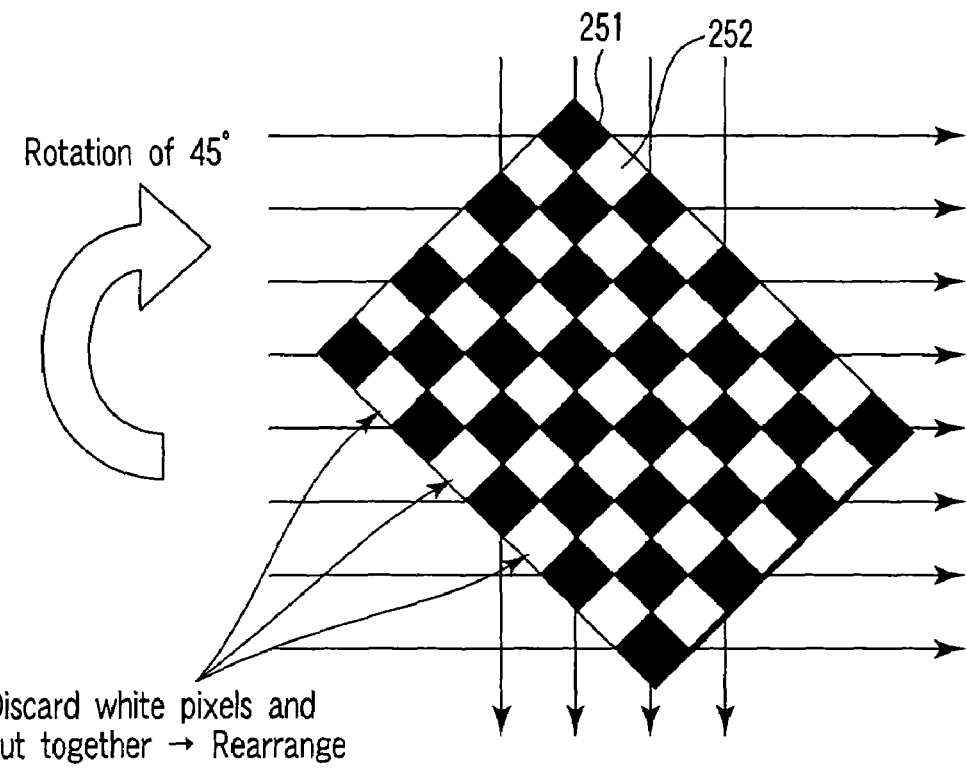
F I G. 30

IMAGE PROCESSING APPARATUS FOR EMBEDDING DIGITAL WATERMARK

CROSS-REFERENCE TO RELATED APPLICATIONS

This application is based upon and claims the benefit of priority from prior Japanese Patent Application No. 2003-424329, filed Dec. 22, 2003, the entire contents of which are incorporated herein by reference.

BACKGROUND OF THE INVENTION

1. Field of the Invention

This invention relates to an image processing apparatus and image processing method which form synthesized image information by embedding and synthesizing additional sub-information (such as security information) set in an invisible state into main image information (such as a face image of a human being) set in a visible state.

2. Description of the Related Art

In recent years, greater importance is attached to the technique for making an electronic watermark or electronic signature in order to prevent forgery or falsification of an image as information is more electronized and the Internet is more widely used. The electronic watermark technique is a technique for embedding additional sub-information (sub-image information) in an invisible state into main image information. For example, the electronic watermark, technique is utilized for a personal authentication medium or work on which personal information such as an IC card is recorded. By use of the electronic watermark technique, it is possible to take a countermeasure against illicit copying, forgery or falsification of a personal authentication medium or work and protect personal information of the personal authentication medium and copyright of the work.

For example, as the electronic watermark technique, a technique for embedding sub-image information in main image information by use of the characteristic of a color-difference component or high spatial frequency component which is difficult to be sensed by a human being.

Further, as an apparatus which records synthesized image information on a recording medium, for example, a recording apparatus of sublimation type thermal transfer recording system or melting type thermal transfer recording system is used.

Generally, in the sublimation type thermal transfer recording system, a material which can be dyed with a sublimation material is limited. Therefore, in the sublimation type thermal transfer recording system, recording media which can be applied are limited and the degree of-freedom of selection of recording media on which an image is recorded is low. Therefore, in the sublimation type thermal transfer recording system, recording media which can be used are limited and the degree of security thereof is lowered in many cases. Further, a sublimation dye is generally low in image durability such as solvent resistance and light resistance.

On the other hand, in the melting type thermal transfer recording system, a coloring material which is generally said to have high light resistance can be selected. Further, in the melting type thermal transfer recording system, the degree of freedom of selection of a recording medium is high. Further, in the melting type thermal transfer recording system, since a recording medium having a highly special property can be used, the degree of security can be enhanced. However, in the melting type thermal transfer recording system, a dot area gradation method which records gradation by changing the sizes of transferred dots is used. Therefore, the melting type thermal transfer recording system has a problem that it is difficult to attain the same gradation performance as that of the sublimation type thermal transfer recording system.

As a countermeasure against the above problem, a method (which is hereinafter referred to as an alternate driving/recording method) for arranging and recording transfer dots in a zigzag form is disclosed.

Further, it is assumed that the electronic watermark technique basically deals with digital data. Therefore, in an image recording apparatus such as a color printer which prints synthesized image information on a recording medium, sub-information embedded in the synthesized image information can be prevented from being destroyed or altered.

For example, in Jpn. Pat. Appln. KOKAI Publication No. H6-59739, a recording method of melting type thermal transfer recording system of an image recording apparatus which enhances the gradation recording performance is disclosed. However, in the recording method disclosed in Jpn. Pat. Appln. KOKAI Publication No. H6-59739, data of zigzag form is thinned out from recording image data and information of a corresponding portion is lost. Therefore, if synthesized image information having sub-information embedded in main image information is recorded on a recording medium by using the technique disclosed in Jpn. Pat. Appln. KOKAI Publication No. H6-59739, there occurs a problem that the sub-information embedded in the synthesized image information will be destroyed.

Further, in Jpn. Pat. Appln. KOKAI Publication No. H9-248935, a technique for embedding sub-information in image data by use of the characteristic of a color-difference component or high spatial frequency component which is difficult to be sensed by a human being is disclosed. However, in the method disclosed in Jpn. Pat. Appln. KOKAI Publication No. H9-248935, only contour information of the sub-information is held in the main image information. Therefore, in the method disclosed in Jpn. Pat. Appln. KOKAI Publication No. H9-248935, only contour information can be held and concentration information cannot be held. As a result, the method disclosed in Jpn. Pat. Appln. KOKAI Publication No. H9-248935 is not suitable for a restoration process or a process for embedding two-dimensional plane information such as a two-dimensional bar code.

BRIEF SUMMARY OF THE INVENTION

Accordingly, an object of this invention is to provide an image processing apparatus which can form synthesized image information whose image quality is difficult to be lowered by sub-information embedded in main image information and in which the sub-information embedded in the main image information cannot be easily discovered.

An image processing apparatus according to an aspect of the present invention which forms synthesized image information having sub-information embedded in an invisible state in main image information comprises a plurality of color-difference amount correction processing sections which subject main image information to color-difference correction processes by use of color-difference amounts respectively set therein, a plurality of color-difference modulation processing sections which correspond in number to the color-difference amount correction processing sections and perform color-difference modulation processes based on a plurality of key information items and a plurality of color-difference amounts corrected by the plurality of color-difference amount correction processing sections, a synthesis processing section which selects a plurality of image information items subjected to color-difference modulation by the plurality of color-difference modulation processing sections based on the sub-information and synthesizes the selected image information items, and a superposition processing section which superposes image information synthesized by the synthesis processing section and used as sub-information on the main image information.

An image processing method according to another aspect of the present invention which forms synthesized image information having sub-information embedded in an invisible state in main image information comprises performing a plurality of color-difference correction processes with respect to main image information by use of color-difference amounts previously set, performing color-difference modulation processes which correspond in number to the color-difference amount correction processes based on a plurality of key information items and a plurality of color-difference amounts corrected by the plurality of color-difference amount correction processes, performing a selection/synthesis process which selects a plurality of image information items subjected to color-difference modulation by the plurality of color-difference modulation processes based on the sub-information and synthesizes the selected image information items, and superposing image information synthesized by the selection/synthesis process and used as sub-information on the main image information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 17 is a diagram showing an example of the correspondence relation between each bit plane corresponding to the number of bits (gradation levels) of the light-shade image as sub-information and a plurality of key information items;

FIG. 18 is a view showing nine divided areas obtained by dividing an area corresponding to one pixel of sub-information;

FIG. 19 is a diagram showing an example of the correspondence relation between the number of bits (gradation levels) representing one pixel of sub-information and key information items of a number equal to the number of bits;

FIG. 20 is a view showing an area 180 of one pixel of sub-information as the processing result by a second selection/synthesis processing method;

FIG. 21 is a view showing an example of key information;

FIG. 24 is a diagram for illustrating the flow of a process of the image processing system 201 for forming a recording material P on which synthesized image information having sub-information embedded in main image information is recorded;

FIG. 27 is a diagram showing an example of recording image information items arranged in a grid form;

FIG. 28 is a diagram showing an image when the image information shown in FIG. 27 is actually recorded by an alternate driving/recording system;

FIG. 29 is a diagram showing an example of the arrangement of whole image information to be recorded;

FIG. 30 is a diagram showing a state in which the image information shown in FIG. 29 is rotated by 45°;

DETAILED DESCRIPTION OF THE INVENTION

There will now be described first and second embodiments of this invention with reference to the accompanying drawings.

First, the first embodiment is explained.

Figure 1:
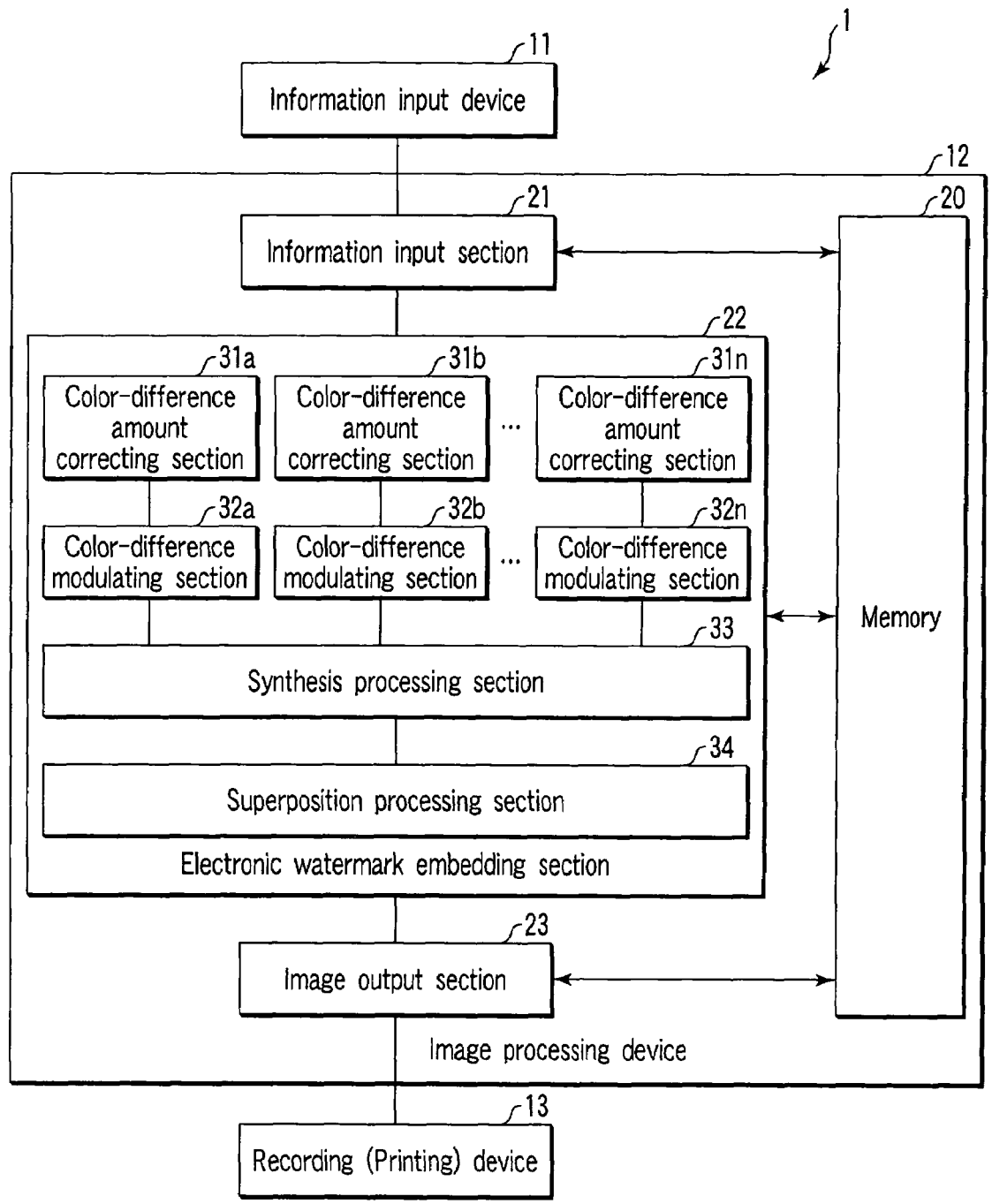
FIG. 1 is a diagram showing an example of the configuration of an image processing system 1 according to a first embodiment of this invention.

FIG. 1 is a diagram showing an example of the configuration of an image processing system 1 according to the first embodiment. For example, the image processing system 1 is an apparatus which issues an ID card as a recording material P on which a face image for person authentication or the like is recorded.

As shown in FIG. 1, the image processing system 1 includes an information input device 11, image processing device 12 and recording device 13. The information input device 11 inputs information such as main image information, sub (image) information and N (a plurality of) key image information items (key information). The image processing device 12 forms synthesized information based on various information items input by the information input device 11. The image processing device 12 is configured by a computer (PC) or the like, for example. Various processes performed by the image processing device 12 are functions realized by an application program installed in the computer. The recording device 13 records a synthesized image formed by the image processing device 12 on a recording medium. For example, the recording device 13 is configured by a color printer which prints a synthesized image on a recording medium.

As shown in FIG. 1, the image processing device 12 includes a memory 20, information input section 21, electronic watermark embedding section 22 and image output section 23.

The memory 20 stores input information and various information items obtained in the course of processing. For example, main image information, a plurality of key information items and sub image information as input information are stored in the memory 20. The information input section 21 is an input interface which inputs information input by the information input device 11.

The electronic watermark embedding section 22 performs a process for embedding sub-information in main image information by use of the main image information, a plurality of key information items and sub-information input by the information input section 21. The image output section 23 is an output interface which outputs information to the recording device 13. The image output section 23 outputs synthesized image information formed by the electronic watermark embedding section 22 to the recording device 13 as recording image data.

Further, as shown in FIG. 1, the electronic watermark embedding section 22 includes a plurality of (N) color-difference amount correcting sections 31 (31a, 31b, ..., 31n), a plurality of (N) color-difference modulating sections 32 (32a, 32b, ..., 32n), synthesis processing section 33 and superposition processing section 34. If the image processing apparatus 12 is configured by a PC, the color-difference amount correcting sections 31 (31a, 31b, ..., 31n), color-difference modulating sections 32 (32a, 32b, ..., 32n), synthesis processing section 33 and superposition processing section 34 are functions realized by an application program.

The color-difference amount correcting sections 31 perform color-difference amount correction processes for main image information by use of preset color-difference amounts $\Delta Cd$. The color-difference modulating sections 32 are respectively provided for the color-difference amount correcting sections 31. The color-difference modulating sections 32 perform color-difference modulation processes for image information subjected to color-difference correction process by the color-difference amount correcting sections 31 according to corresponding key information items among a plurality of key information items. With the above configuration, N image information items can be obtained by subjecting N key information items as the processing results of the color-difference modulation processes to color-difference modulation.

The synthesis processing section 33 performs a selecting process and synthesizing process for a plurality of image information items subjected to color-difference modulation by the color-difference modulating sections 32 based on sub-information 102. The superposition processing section 34 performs a superposition process for superposing image information as the processing result of the synthesis processing section 33 with respect to main image information as input information. With the above configuration, the electronic watermark embedding section 22 performs a process for embedding sub-information in main image information.

Next, the flow of the process of the image processing system 1 the image processing system 1 with the above configuration with the above configuration for forming a recording medium (recording material) P on which synthesized information having sub-information embedded in main image information is recorded is schematically explained.

Figure 2:
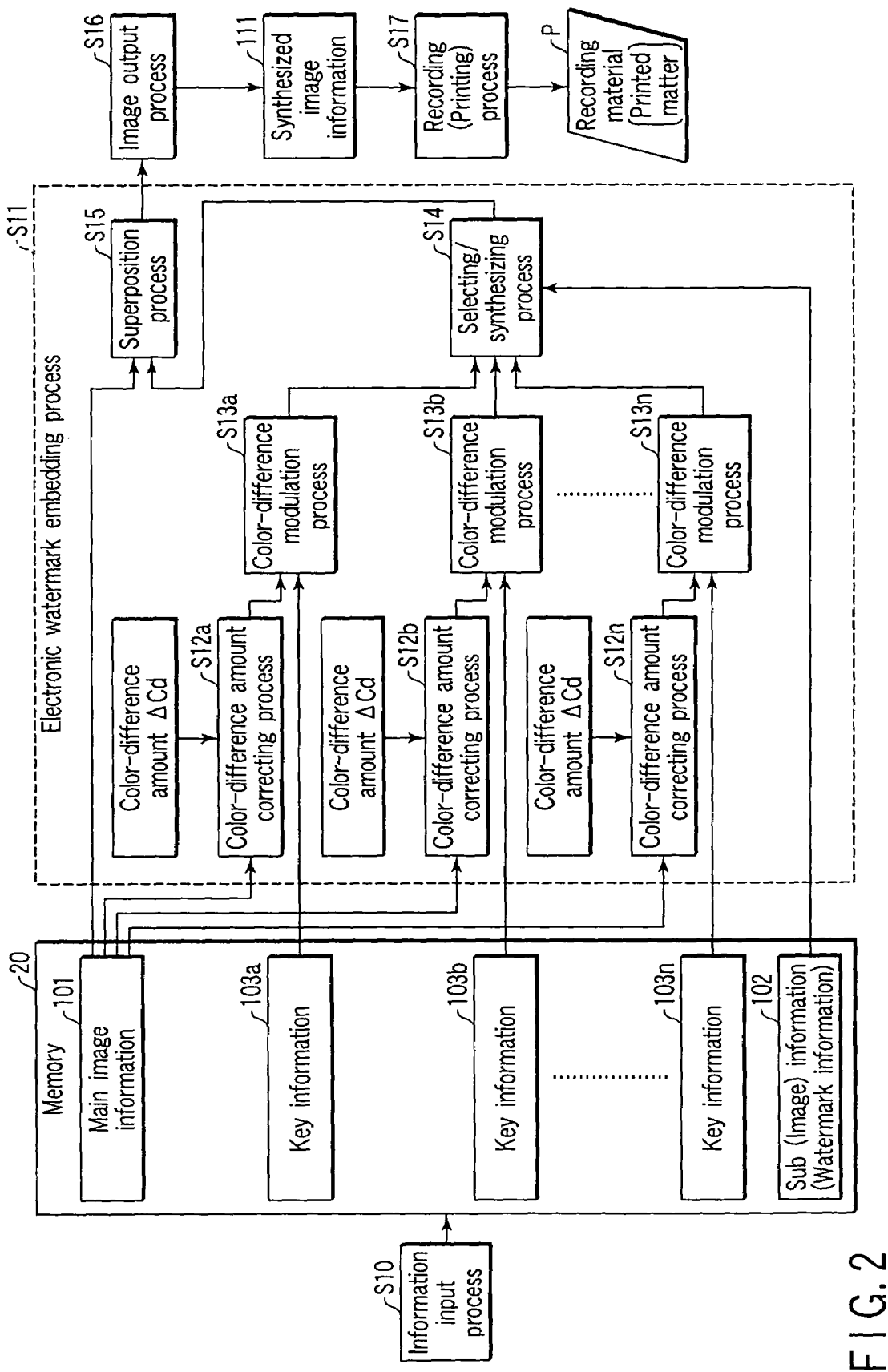
FIG. 2 is a diagram for illustrating the flow of a process of the image processing system 1 for forming a recording material P on which synthesized image information having sub-information embedded in main image information is recorded.

FIG. 2 is a diagram for illustrating the flow of the process of the image processing system 1 for forming the recording material P on which synthesized image information having sub-information embedded in main image information is recorded.

First, the image processing system 1 performs an information input process for fetching various information items input by the information input device 11 and used to form a recording material into the image processing device 12 by use of the information input section 21 (step S10). In the information input process, input information is recorded in the memory 20.

For example, information such as main image information 101, sub (image) information 102 and a plurality of (N) key image information (key information) items 103 (103a, 103b, . . . , 103n) is input as input information. The key information items 103a, 103b, . . . , 103n are different types of key information items corresponding to the color-difference amount correcting sections 31a, 31b, . . . , 31n. In this case, it is assumed that main image information such as face image information is a color image having an R (red), G (green) and B (blue) components. Further, it is assumed that the key information items 103a, 103b, 103n are represented by binary images.

If information is input in the information input process, the electronic watermark embedding section 22 performs an electronic watermark embedding process for embedding the sub-information 102 in the main image information 101 input in the information input process by use of a plurality of key information items 103a, 103b, . . . , 103n (step S11).

In the electronic watermark embedding process, the color-difference amount correcting process for the main image information 101 input by the information input section 21 is first performed by use of the color-difference amount correcting sections 31a, 31b, . . . , 31n (steps S12a, S12b, . . . , S12n). In the color-difference amount correcting process, a process for correcting a color-difference amount with respect to the main image information 101 is performed by each of the color-difference amount correcting sections 31 by using a preset color-difference amount $\Delta Cd$.

The main image information in which the color-difference amount is corrected by each of the color-difference amount correcting sections 31 is subjected to the color-difference modulation process by the color-difference amount modulating sections 32 (32a, 32b, . . . , 32n) corresponding to the above color-difference amount correcting sections 31 (step S13a, S13b, . . . , S13n). In the color-difference modulation process, color differences of the main image information items whose color-difference amounts are corrected by the color-difference amount correcting sections 31 are modulated by use of the key information items 103a, 103b, . . . , 103n corresponding to the color-difference amount modulating sections 32.

A plurality of image information items whose color differences are modulated by the color-difference modulation process are subjected to the selecting and synthesizing processes by the synthesis processing section 33 (step S14). In the selecting/synthesizing process, desired information is selected from a plurality of image information items whose color differences are modulated by the color-difference modulation processing sections 32 and synthesized information items are synthesized.

In the synthesized image information formed by the selecting and synthesizing process, a process for superposing the information on the main image information 101 is performed by the superposition processing section 34 (step S15). That is, in the superposition process, synthesized image information 111 having image information as the result of the process of the synthesis processing section 33 superposed on the main image information 101 as input information is formed. The thus formed synthesized image information 111 is output to the recording device 13 by the image output section 23 as information to be recorded on a recording medium (step; S16).

In the recording device 13, if the synthesized image information 111 is output from the image processing device 12, a recording process for recording the synthesized image information output from the image processing device 12 on a recording medium is performed (step S17). The main image information obtained by superposition in the superposing process is visible and sub-information is invisible. Therefore, since the sub-information 102 is invisible to the eyes of a human being, only the main image information 101 of the recording material (printed matter) P on which the synthesized image information is recorded by the recording process can be visually recognized.

Next, a process for restoring sub-information from synthesized image information recorded on the recording material formed by the image processing system 1 is explained.

Figure 3:
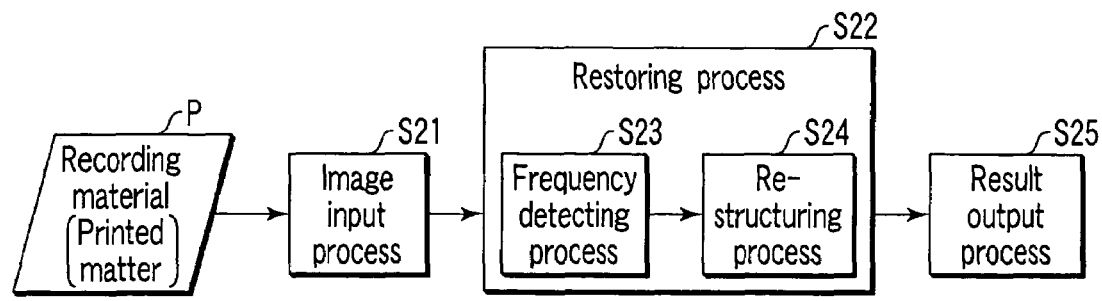
FIG. 3 is a diagram for illustrating the flow of an electronic watermark restoring process for restoring or reproducing sub-information from the synthesized image information recorded on the recording material P.

FIG. 3 is a diagram for illustrating the flow of an electronic watermark restoring process for restoring or reproducing sub-information from the synthesized image information recorded on the recording material P. The above process is performed by an electronic watermark restoring apparatus. For example, the electronic watermark restoring apparatus is realized by a computer to which an image reading device and display device are connected. With the above configuration, processes which will be described below are functions realized by causing the computer to execute various types of processing programs.

As shown in FIG. 3, as the process for restoring an electronic watermark recorded on the recording material P, the electronic watermark restoring apparatus first performs an image input process for inputting synthesized image information recorded on the recording material P (step S21). For example, the image input process is realized by causing the electronic watermark restoring apparatus to optically read the synthesized image information recorded on the recording material P by use of the image reading device, convert the read information into digital form and input the thus formed digital image information.

If image information recorded on the recording material P is input by the above image input process, the electronic watermark restoring apparatus performs a restoring process for restoring sub-information as an electronic watermark in the input image information (step S22). As the sub-information restoring process, for example, a frequency detecting process and re-structuring process are performed.

The frequency detecting process is a process for detecting a spatial frequency component of particular (one) key information among a plurality of key information items from the image information input by the image input process (step S23). For example, when the spatial frequency component of the key information 103a is detected, the spatial frequency component of the key information 103a is detected from the image information input by the image input process in the frequency detecting process.

The re-structuring process is a process for re-structuring sub-information based on the spatial frequency component detected by the frequency detecting process (sep S24). As the result of the re-structuring process, sub-information restored from the printed matter P is obtained. For example, when the spatial frequency component of the key information 103a is detected by the frequency detecting process, sub-information is re-structured based on the spatial frequency component of the key information 103a detected by the frequency detecting process in the re-structuring process.

If sub-information is restored by the sub-information restoring process, the electronic watermark restoring apparatus outputs the restored sub-information (step S25). For example, in the electronic watermark restoring apparatus, the restored sub-information is displayed on the display section. Thus, the truth or not of the recording material P can be determined based on the output result of the restored sub-information (for example, sub-information displayed on the display section). In this case, it is also possible for the electronic watermark restoring apparatus to determine the truth of not of the recording material P according to whether or not the restored sub-information coincides with desired sub-information and output the result of determination.

Next, concrete examples of various types of information items to which the electronic watermark restoring process is applied are explained.

Figure 4:
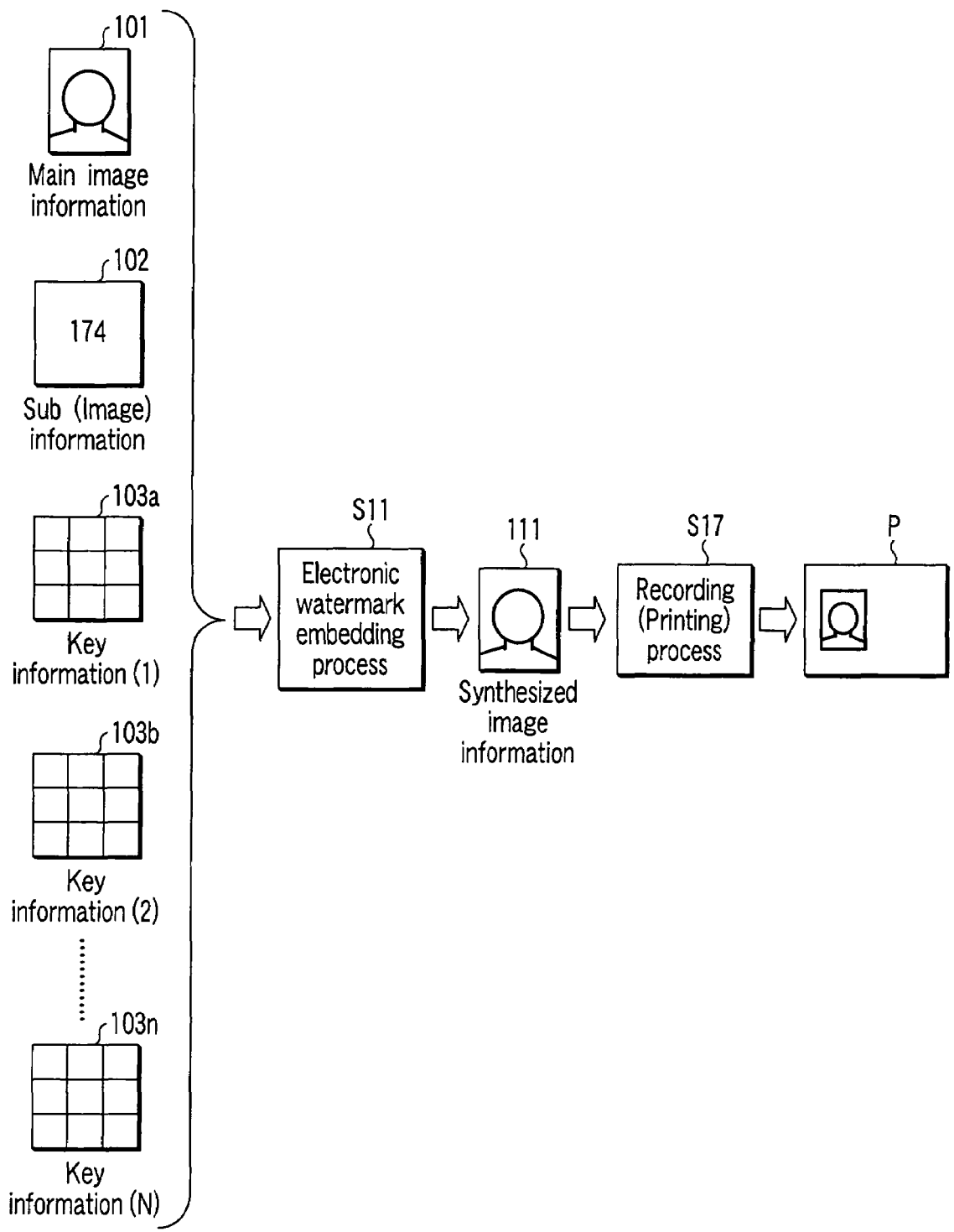
FIG. 4 is a diagram for illustrating examples of main image information, sub-information and a plurality of key information items.

FIG. 4 is a diagram for illustrating examples of main image information, sub-information and a plurality of key information items.

The main image information 101 is a personal face image as personal authentication information printed on an ID card used as a recording material, for example. Further, the main image information 101 is not limited to the personal authentication face image and may be an image such as a pattern of securities. In addition, the main image information 101 may be a black-white gradation image or a full-color image.

The sub (image) information 102 is information to enhance the degree of security of the main image information 101, information used for truth determination, or information used for copyright management (which is a numeral "174" in an example of FIG. 4). As the sub-information 102, information obtained by converting a binary bit string into a light-shade image, information obtained by coding a name or date of birth and converting the coded data into an image, a pattern of a logo mark of a company or organization or the like can be used.

The key information items 103a, 103b, . . . , 103n are information items used in the electronic watermark embedding process and sub-information restoring process. As the key information items 103a, 103b, . . . , 103n, information obtained by converting a binary bit string into a binary (black-white) image, binary image configured by a geometrical pattern, or information obtained by converting a (pseudo) random number pattern formed based on a preset seed into a binary image can be used.

If the main image information 101, sub-information 102 and key information items 103a, 103b, . . . , 103n are given, the image processing system 1 performs the electronic watermark embedding process by use of the above information items. In the synthesized image information (electronic watermark embedded image information) 111 obtained by the electronic watermark embedding process, the sub-information 102 is set in an invisible state and the main image information 101 is set in a visible state. If the synthesized image information 111 is formed, the image processing system 1 performs a printing process for printing the synthesized image information 111 on a recording medium (step S17). Thus, a recording material P on which the main image information 101 having the sub-information 102 embedded therein in a invisible state by use of a plurality of key information items 103a, 103b, . . . , 103n is printed is completed.

Next, an ID card as one example of the recording material P formed by the above image processing system 1 is explained.

Figure 5:
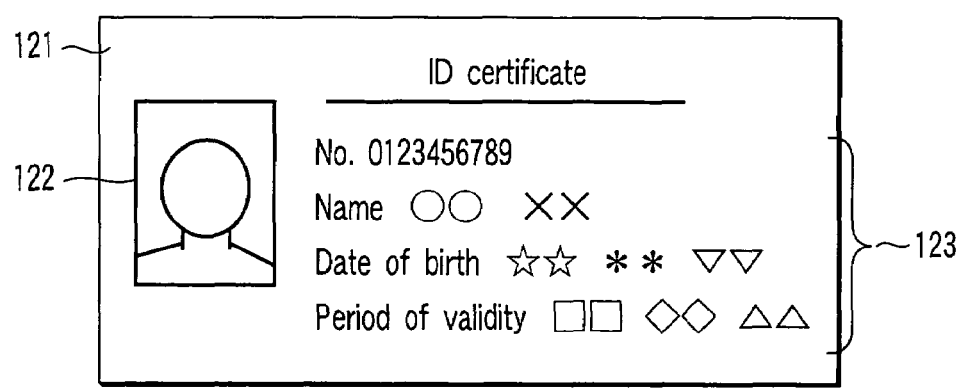
FIG. 5 is a view showing an IC card 121 as one example of the recording material formed by the image processing system 1.

FIG. 5 shows an IC card 121 as one example of the recording material formed by the image processing system 1. On the ID card 121, a face image 122 of a possessor of the ID card and personal management information 123 of the possessor of the ID card are recorded.

The face image 122 is synthesized information subjected to the electronic watermark process explained with reference to FIG. 2 or 4. That is, in the face image 122, sub-information is embedded in an invisible state in a face image as main image information set in a visible state.

The personal management information 123 is personal information containing an identification number (ID number), name, date of birth, period of validity or the like. Further, part of the personal management information 123 can be used as sub-information. In this case, in the ID card 121, the face image 122 and personal management information 123 can be related to each other. By setting the face image 122 and personal management information 123 in association with each other, it becomes difficult to forge or falsify part of recording material 121. As a result, the degree of security of the ID card 121 can be enhanced.

Next, the color-difference modulation process by each of the color-difference modulating sections 32 is explained in detail.

FIGS. 6A to 6E are diagrams for illustrating the color-difference modulation process of each color-difference modulating section 32.

As is explained with reference to FIG. 1 or 2, in each of the color-difference modulating sections 32, the color-difference modulation process is performed by use of the key information 103 and corrected color-difference amount obtained in the color-difference amount correction process by a corresponding one of the color-difference amount correcting sections 31.

In this example, in order to clarify the explanation, a case wherein binary key information 103 is embedded in a constant color-difference amount is explained.

Figure 6A:
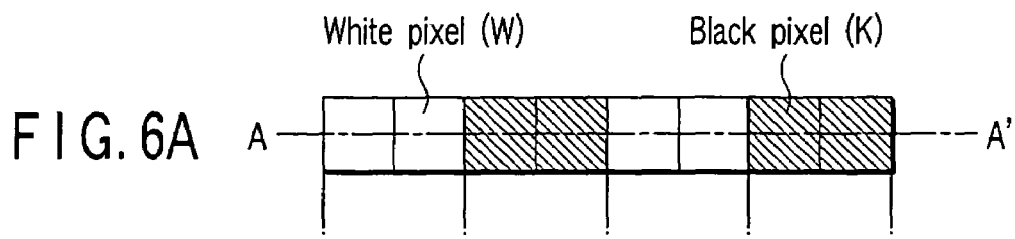
FIG. 6A is a diagram showing part of binary key information 103.

FIG. 6A shows part of the binary key information 103 (eight pixels in a horizontal direction× one pixel in a vertical direction). In FIG. 6A, it is assumed that a white portion indicates a white pixel (W) and a slant-line portion indicates a black pixel (K).

The color-difference amount $\Delta CD$ is divided into three components of R, G and B components. That is, the color-difference amount $\Delta CD$ includes a color-difference amount $\Delta CD_{-R}$ of the R component, a color-difference amount $\Delta CD_{-G}$ of the G component and a color-difference amount $\Delta CD_{-B}$ of the B component. If the color-difference amount is expressed by eight bits, it is assumed that $255 \geq \Delta CD_{-R}$, $\Delta CD_{-G}$, $\Delta CD_{-B} \geq 0$. In this example, the value of $\Delta CD$ is also the intensity of the electronic water mark. For example, as the value of $\Delta CD$ becomes larger, it becomes easier to restore sub-information from the synthesized image information in the electronic watermark restoring process. If the value of $\Delta CD$ is set excessively large, sub-information in the synthesized image information can be easily discovered.

In the color-difference modulation process, the color-difference amount $\Delta CD$ is derived based on the following equations (A-1) to (A-6) for each component of the R component $\Delta CD_{-R}$, the G component $\Delta CD_{-G}$ and the B component $\Delta CD_{-B}$.

$$\text{In the case of KEY}(i,j)=W, RSLT(i,j)_{-R}=+\Delta CD_{-R} \quad\quad\quad \text{(A-1)}$$

$$RSLT(i,j)_{-G}=-\Delta CD_{-G} \quad\quad\quad \text{(A-2)}$$

$$RSLT(i,j)_{-B}=-\Delta CD_{-B} \quad\quad\quad \text{(A-3)}$$

$$\text{In the case of KEY}(i,j)=K, RSLT(i,j)_{-R}=-\Delta CD_{-R} \quad\quad\quad \text{(A-4)}$$

$$RSLT(i,j)_{-G}=+\Delta CD_{-G} \quad\quad\quad \text{(A-5)}$$

$$RSLT(i,i)_{-B}=+\Delta CD_{-B} \quad\quad\quad \text{(A-6)}$$

where KEY(i,j) indicates key information and RSLT(i,j) indicates the result of the color-difference modulation process.

Figure 6B:
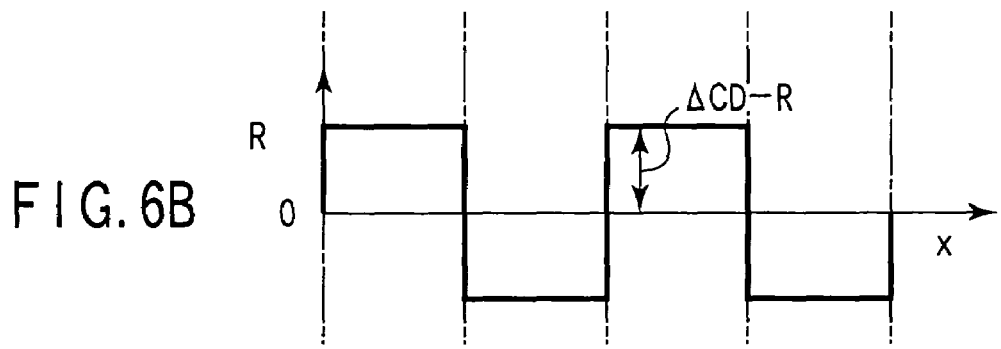
FIG. 6B is a diagram showing the processing result of color-difference modulation for a color-difference amount of an R component by use of the key information shown in FIG. 6A.
Figure 6C:
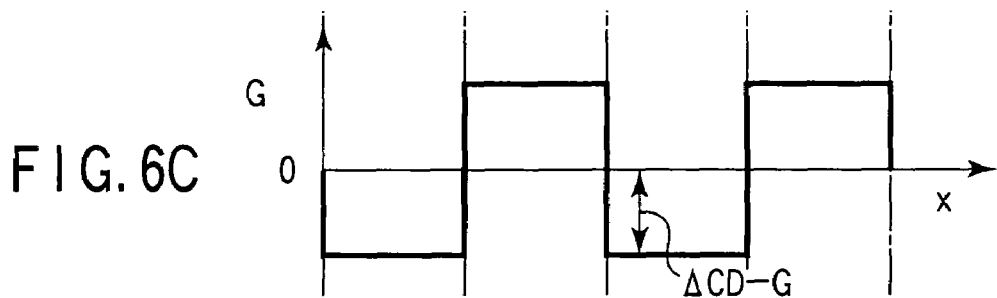
FIG. 6C is a diagram showing the processing result of color-difference modulation for a color-difference amount of a G component by use of the key information shown in FIG. 6A.
Figure 6D:
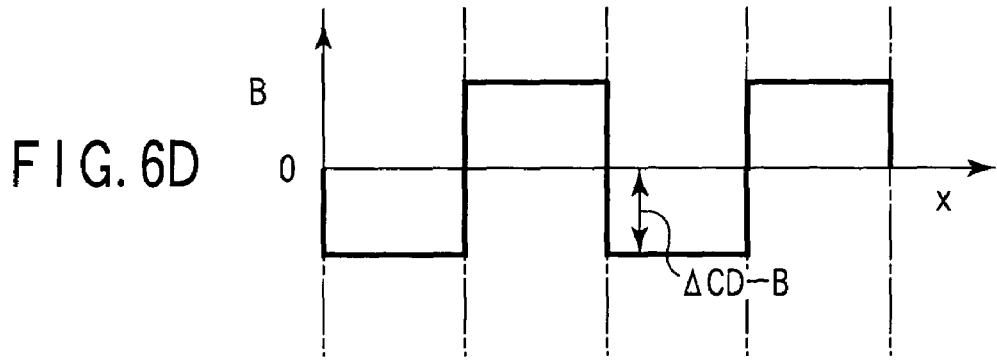
FIG. 6D is a diagram showing the processing result of color-difference modulation for a color-difference amount of a B component by use of the key information shown in FIG. 6A.
Figure 6E:
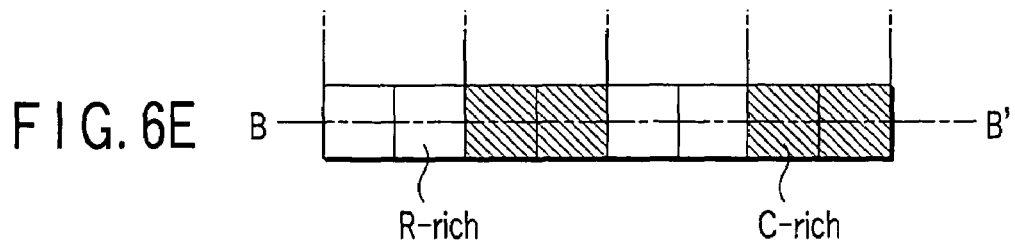
FIG. 6E is a diagram showing the processing result of color-difference modulation obtained by synthesizing the processing result of color-difference modulation of the R component shown in FIG. 6B, the processing result of color-difference modulation of the G component shown in FIG. 6C and the processing result of color-difference modulation of the B component shown in FIG. 6D.

FIG. 6B shows the result $RSLT_{-R}$ of the color-difference modulation process for the color-difference amount $\Delta CD_{-R}$ of the R component by the key information shown in FIG. 6A. FIG. 6C shows the result $RSLT_{-G}$ of the color-difference modulation process for the color-difference amount $\Delta CD_{-G}$ of the G component by the key information shown in FIG. 6A. FIG. 6D shows the result $RSLT_{-B}$ of the color-difference modulation process for the color-difference amount $\Delta CD_{-B}$ of the B component by the key information shown in FIG. 6A. Further, FIG. 6E shows image information. FIG. 6E shows the processing result of color-difference modulation obtained by synthesizing $RSLT_{-R}$ shown in FIG. 6B, $RSLT_{-G}$ shown in FIG. 6C and $RSLT_{-B}$ shown in FIG. 6D.

That is, in the processing result of color-difference modulation for the color-difference amount $\Delta CD$ by the-key information shown in FIG. 6A, as shown in FIG. 6E, a portion corresponding to the white pixels (W) of the key information becomes rich in the red component (R-rich) and a portion corresponding to the black pixels (K) of the key information becomes rich in the cyan component (C-rich). R (red) and C (cyan) are set in a physically complementary color relation. Therefore, a color obtained by adding the above colors together becomes an achromatic color.

Thus, if the pitch of pixels in the image information is set to a high resolution (approximately 300 dpi or more) which exceeds the sensible range of the naked eyes of a human being, red and cyan in the image information cannot be separately identified and are visually recognized as an achromatic color (gray). That is, by applying the color-difference modulation process to convert a key information pattern into a color-difference information pattern, the key information pattern can be apparently replaced by achromatic color information.

In the color-difference modulation process, as an example of a complementary color, the color-difference modulation process using red and cyan is explained. However, a color-difference modulation process which is the same as the above color-difference modulation process can be realized by using other combinations of complementary colors such as green and magenta, blue and yellow and the like.

Further, in the above color-difference modulation process, as shown in FIG. 6E, red is allocated to the white pixels of key information shown in FIG. 6A and cyan is allocated to the black pixels. However, colors allocated in the color-difference modulation process are set in a relative relation. That is, even if the complementary colors respectively allocated to binary key information items are allocated in reverse, there occurs no problem in principle.

Further, in an example of the key information shown in FIG. 6A, an image (pattern) in which white and black pixels are changed at regular intervals in a two-pixel unit is provided. However, key information may contain black and white pixels in substantially the same ratio in a particular area (a macro area visually recognized by the naked eyes of a human being) in principle. As described above, key information may be information which cannot be identified by the naked eyes of a human being. Therefore, binary pixels in the key information are not always required to appear at regular intervals. For example, as the key information, a random number (pseudo) pattern generated based on a certain seed can be used.

Next, the color-difference amount correction process by the color-difference amount correcting section 31 is explained in detail.

Figure 7:
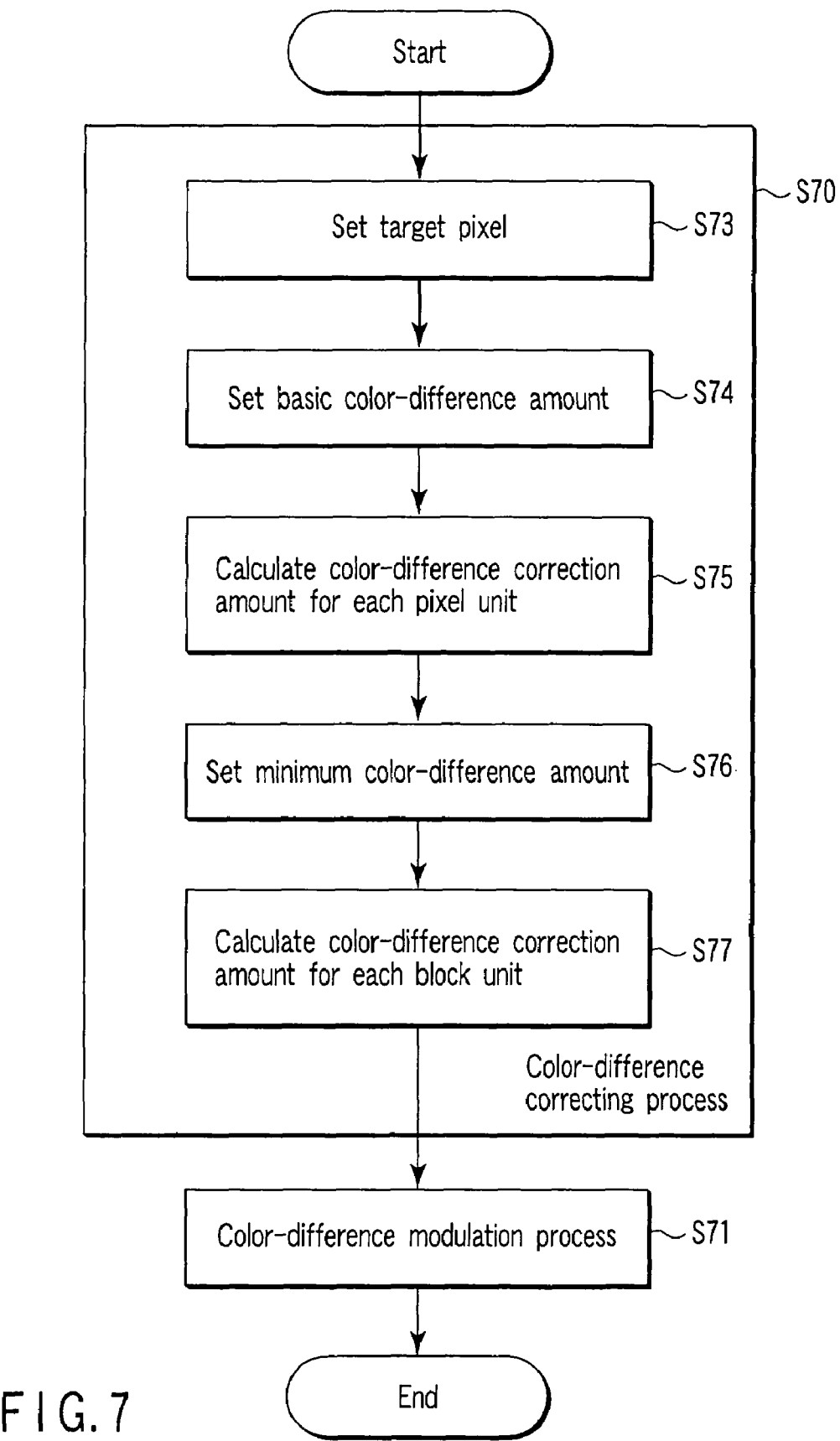
FIG. 7 is a diagram for illustrating the flow of the whole color-difference amount correction process.

FIG. 7 is a diagram for illustrating the flow of the whole color-difference amount correction process.

In this case, the color-difference amount correction process based on a color-difference amount which is not constant is explained.

The step S70 shown in FIG. 7 is the color-difference amount correction process by the color-difference amount correcting section 31 (corresponding to the steps 12a, 12b, . . . , 12n shown in FIG. 2, for example) and the step S71 shown in FIG. 7 is the color-difference modulating process by the color-difference modulating section 32 (corresponding to the steps 13a, 13b, . . . , 13n shown in FIG. 2, for example).

In the color-difference amount correction process of the step S70, each color-difference amount correcting section 31 sets a target pixel in the main image information 101 (step S73). If the target pixel in the main image information 101 is set, each color-difference amount correcting section 31 sets a color-difference amount used as a reference (step S74). The color-difference amount used as the reference is the color-difference amount $\Delta Cd$ shown in FIG. 2 and is a previously set value.

If the reference color-difference amount is set, each color-difference correcting section 31 performs a correction amount calculating process (color-difference correction process in each pixel unit) for a color-difference amount in the pixel unit based on each of pixel information items which configure the main image information 101 (step S75). The color-difference correction process of each pixel unit is a process which prevents occurrence of overflow or underflow of image information at the time of a superposition process which will be described later.

If the color-difference correction process of each pixel unit is performed, each color-difference correcting section 31 sets a minimum color-difference amount (step S76). The minimum color-difference amount is previously set as a parameter. The minimum color-difference amount is used to prevent that the color-difference amount becomes "0" and the electronic watermark embedding process cannot be performed (sub-information cannot be embedded).

If the minimum color-difference amount is set, each color-difference amount correcting section 31 performs a correction amount calculating process (color-difference correction process of each block unit) for a color-difference amount of each block unit. The color-difference correction process of each block unit is a process which establishes a coordinated relation between the pixels (step S77).

The coordinated relation between the pixels cannot be established only by the color-difference correction process of each pixel unit in the step S74. That is, when only the color-difference correction process of each pixel unit in the step S74 is used, the color-difference correction amounts may be variously changed in each pixel unit. Therefore, in each color-difference amount correcting section 31, the correction process is performed again for the block area in a preset range by performing the color-difference correction process in the block unit as described above.

In the color-difference correction process of each block unit, it is preferable to set a range corresponding to the inherent interval of the key information items used in the color-difference modulation process as the block area. This is because the balance between the color differences of the image information can be easily attained.

The result of a series of processes is the result of the color-difference correction process. Therefore, the color-difference amount obtained in the color-difference correction process of each block unit in the step S77 is supplied as the result of the color-difference correction process to each color-difference modulating section 32. Thus, in each color-difference modulating section 32, the color-difference modulating process is performed for the corrected color-difference amount.

As shown in FIG. 2, when a plurality of (for example, n) key information items are used, the color-difference modulating process is performed for a plurality of corrected color-difference amounts obtained by the color-difference correction process of each color-difference amount correcting section 31 in each color-difference modulating section 32. Therefore, when a plurality of key information items are used, a plurality of results of color-difference modulating processes can be obtained.

Next, the selecting/synthesizing process (step S14) by the synthesis processing section 33 is explained in detail.

First, the number of connecting pixels in the image information is explained.

In this case, a pixel arranged adjacent to a pixel of a particular color and having the same color (or a color of the same series) as the particular color is defined as a connecting pixel. Therefore, in a binary image configured by black and white pixels, adjacent white pixels or adjacent black pixels are called connecting pixels. The number of pixels which configure an area (connecting component) including a pixel of a particular color and a pixel or pixels arranged adjacent thereto and having a color of the same series is defined as the number of connecting pixels. Therefore, in the binary image, the number of pixels configuring an area containing adjacent white pixels (the number of white pixels used for connection) or the number of pixels configuring an area containing adjacent black pixels (the number of black pixels used for connection) is called the number of connecting pixels.

Figure 8:
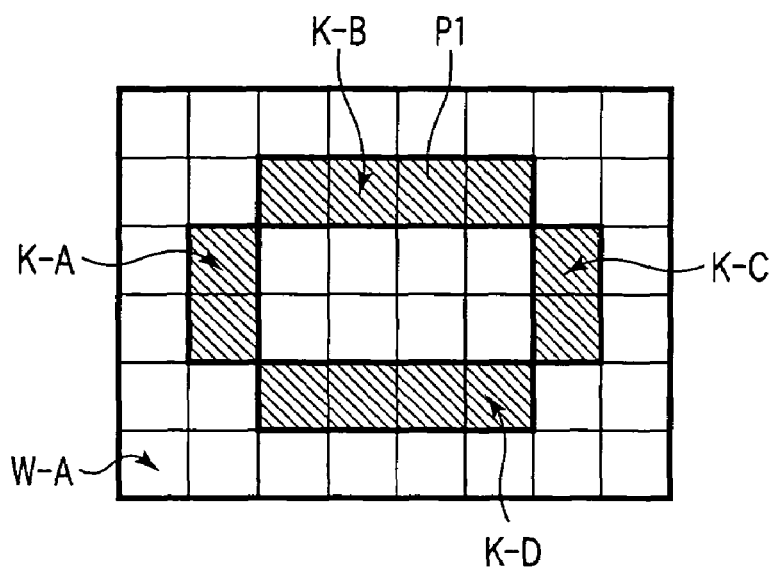
FIG. 8 is a view showing an example of a black-white image as an example of a binary image.

FIG. 8 is a view showing an example of a black-white image as an example of a binary image. The binary image shown in FIG. 8 is configured by a plurality of pixels including eight pixels in the horizontal direction× six pixels in the vertical direction. Further, in the binary image shown in FIG. 8, a pattern P1 is configured by black pixels indicated by slant lines in FIG. 8 on the background of white pixels in an area of eight pixels in the horizontal direction× six pixels in the vertical direction.

Therefore, in the binary image shown in FIG. 8, the number of connecting pixels of black pixels in an area K-A is two, the number of connecting pixels of black pixels in an area K-B is four, the number of connecting pixels of black pixels in an area K-C is two, the number of connecting pixels of black pixels in an area K-D is four, and the number of connecting pixels of white pixels in an area W-A is twenty-eight.

Next, an example of the key information 103 used in the color-difference modulating process is explained.

Figure 9:
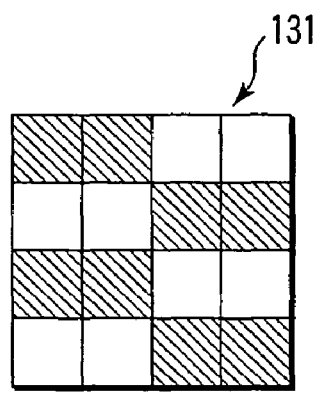
FIG. 9 is a view showing an example of key information as an example of a binary image.
Figure 10:
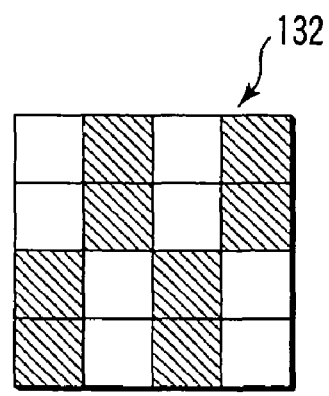
FIG. 10 is a view showing an example of key information as an example of a binary image.

FIG. 9 shows an example of key information 131 as a binary image. FIG. 10 shows an example of key information 132 as a binary image. In FIGS. 9 and 10, a white portion indicates a white pixel (W) and a slant-line portion indicates a black pixel (K).

Figure 11:
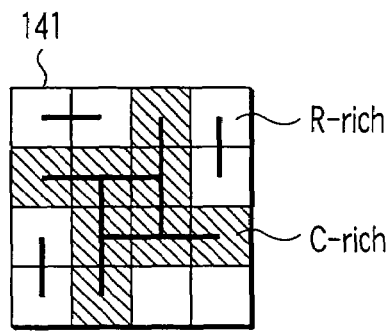
FIG. 11 is a view showing an example of a central portion of image information obtained by synthesizing four image information items.
Figure 12:
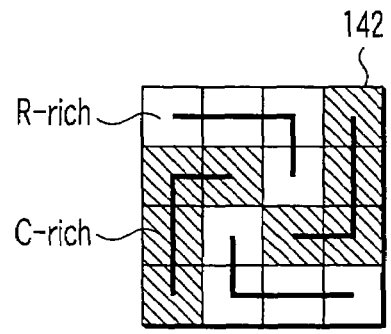
FIG. 12 is a view showing an example of a central portion of image information obtained by synthesizing four image information items.

Further, FIGS. 11 and 12 show examples of image information items 141, 142 obtained as the processing results of the selecting/synthesizing process. The image information 141 shown in FIG. 11 and the image information 142 shown in FIG. 12 are examples obtained by first subjecting the key information 131 shown in FIG. 9 and the key information 132 shown in FIG. 10 to the color-difference modulating process and then subjecting them to the selecting/synthesizing process based on sub-information. In FIGS. 11 and 12, a white portion indicates a pixel which is rich in a red component (R-rich) and a slant-line portion indicates a pixel which is rich in a cyan component (C-rich). Further, in FIGS. 11 and 12, a central portion (four pixels in the horizontal direction× four pixels in the vertical direction) in the image information of eight pixels in the horizontal direction× eight pixels in the vertical direction obtained by synthesizing four image information items each having four pixels in the horizontal direction× four pixels in the vertical direction.

In the image information 141 shown in FIG. 11, the number of connecting pixels which are cyan component rich (C-rich) pixels is eight and the number of connecting pixels which are red component rich (R-rich) pixels is two. In other words, the image information 141 shown in FIG. 11 has the maximum number of eight connecting pixels (C-rich) and the minimum number of two connecting pixels (R-rich). Further, in the image information 141 shown in FIG. 11, pixels which are cyan component rich (C-rich) are concentrated with the central portion set as a center (particular area). Therefore, in the image information 141 shown in FIG. 11, it can be said that the color balance of red (R)-cyan (C) is bad. In such image information, there is a strong possibility that the image quality attained after the electronic watermark embedding process is deteriorated and sub-information is discovered.

In the image information 142 shown in FIG. 12, the number of connecting pixels which are cyan component rich (C-rich) pixels is four and the number of connecting pixels which are red component rich (R-rich) pixels is four. In other words, the image information 142 shown in FIG. 12 has the maximum number of four connecting pixels (C-rich) and the minimum number of four connecting pixels (R-rich). Further, in the image information 142 shown in FIG. 12, neither pixels which are cyan component rich nor pixels which are red component rich are concentrated with the central portion set as a center (particular area). Therefore, in the image information 142 shown in FIG. 12, it can be said that the color balance of red (R)-cyan (C) is good. In such image information, the image quality attained after the electronic watermark embedding process is difficult to be deteriorated and sub-information is difficult to be discovered.

Therefore, in the selecting/synthesizing process by the synthesis processing section 33, the image processing operation is performed so as to reduce the number of connecting pixels in the image information subjected to color-difference modulation. For example, in the selecting/synthesizing process, the rotation process or the like is performed for the image information obtained as the result of the color-difference modulation process so as to reduce the number of connecting pixels in a preset area.

Next, an example of the selecting/synthesizing process by the synthesis processing section 33 is explained with reference to FIGS. 13 to 15.

Figures 13, 14, 15:
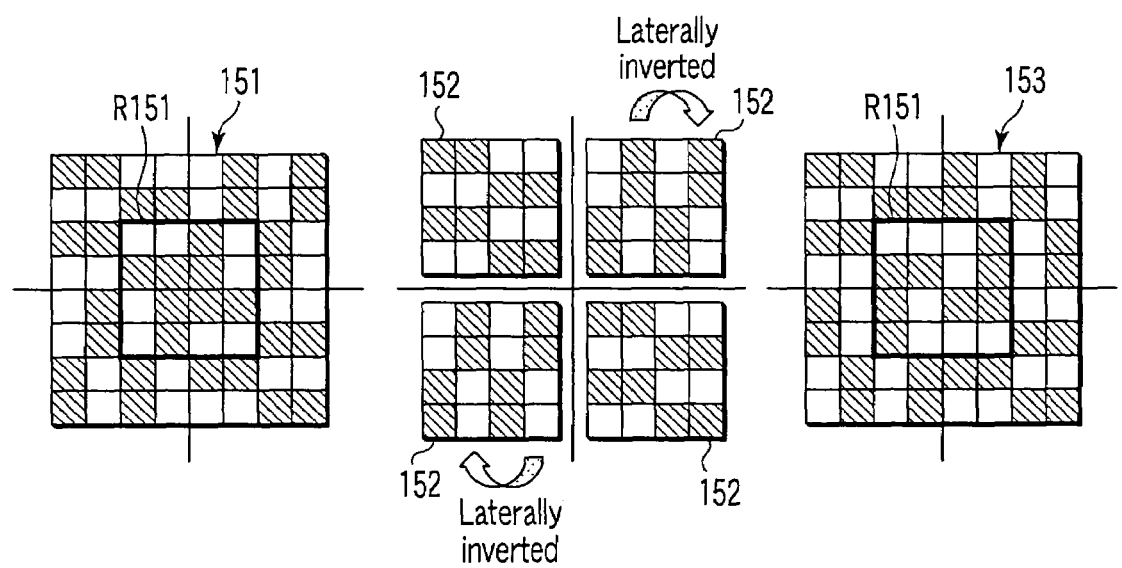
FIG. 13 is a view showing an example of image information obtained by synthesizing a plurality of image information items subjected to color-difference modulation by use of a plurality of key information items based on sub-information.
FIG. 14 is a view showing an example of four image information items obtained by dividing the image information of FIG. 13.
FIG. 15 is a view showing image information as the processing result of a selecting/synthesizing process.

FIG. 13 is a view showing an example of image information 151 obtained by synthesizing a plurality of image information items subjected to color-difference modulation by use of a plurality of key information items based on sub-information. FIG. 14 is a view showing an example of four image information items 152a to 152d obtained by dividing the image information 151 of FIG. 13. FIG. 15 is a view showing image information 153 as the processing result of a selecting/synthesizing process. In FIGS. 13, 14 and 15, a white portion indicates a red component rich (R-rich) pixel and a slant-line portion indicates a cyan component rich (C-rich) pixel.

The image information 151 shown in FIG. 13 is divided into a plurality of image information items according to a plurality of key information items used in the color-difference modulation process. For example, the image information 151 shown in FIG. 13 is divided into four image information items 152a, 152b, 152c, 152d shown in FIG. 14. The image information items 152a and 152d shown in FIG. 14 are image information subjected to color-difference modulation by using the key information 131 shown in FIG. 9. The image information items 152b and 152c shown in FIG. 14 are image information subjected to color-difference modulation by using the key information 132 shown in FIG. 10.

In the number of connecting pixels of the image information 151 shown in FIG. 13, the maximum number of connecting pixels is eight and the minimum number of connecting pixels is two. The connecting pixels of the maximum number are configured by cyan component rich (C-rich) pixels and exist in an area R151 shown in FIG. 13. Therefore, in the image information 151 shown in FIG. 13, the color balance of the red (R)-cyan (C) is bad. If the color balance in the whole image is bad, the image quality is deteriorated and sub-information tends to be discovered. For example, in the image information 151, since the number of connecting pixels which are cyan component rich (C-rich) pixels is large, a cyan color may be easily visually recognized.

Therefore, if the image information 151 shown in FIG. 13 can be divided into the four image information items 152a to 152d shown in FIG. 14, the image information items 152b and 152c are laterally inverted by the synthesis processing section 33. Then, the image information 151 shown in FIG. 13 is converted to image information 153 shown in FIG. 15. In the number of connecting pixels of the image information 153 shown in FIG. 15, the maximum number of connecting pixels is four and the minimum number of connecting pixels is two. In the area R151 of a central portion of the image information 153 shown in FIG. 15, the number of connecting pixels which are red component rich (R-rich) pixels indicated by white portions and cyan component rich (C-rich) pixels indicated by slant-line portions are set to four. Therefore, in the image information 153 shown in FIG. 15, the color balance of red (R)-cyan (C) is improved in comparison with the image information 151 shown in FIG. 13. As the image information 153 shown in FIG. 15, if the color balance in the whole image is good, the image quality is difficult to be deteriorated and sub-information is difficult to be discovered.

Next, an example of the sub-information 102 is explained. As the sub-information 102 used in the electronic watermark embedding process, image information obtained by converting a binary bit string into a light-shade image, image information obtained by coding a name, date of birth or the like and converting the thus coded data into an image or image information of a pattern such as a logo mark of a company or organization can be used.

Figure 16:
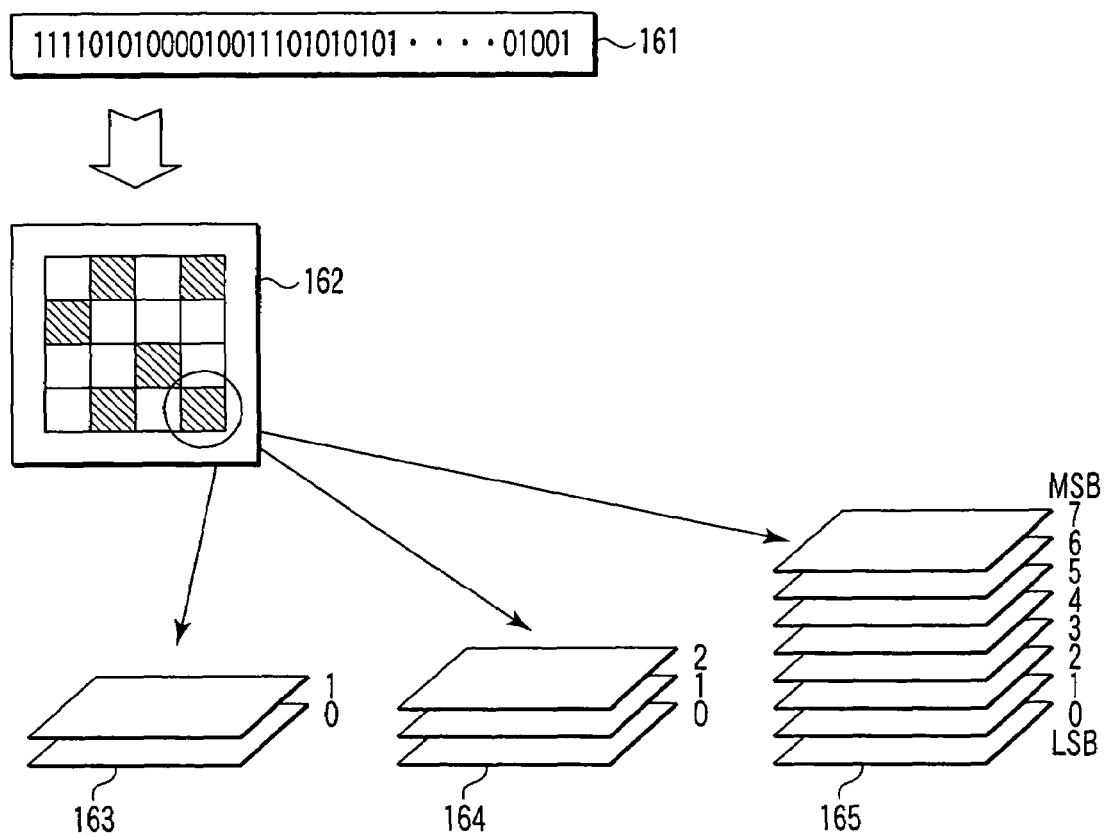
FIG. 16 is a view showing an example of sub (image) information obtained by converting a code into a light-shade image.

FIG. 16 is a view showing an example of sub (image) information 162 obtained by converting a code 161 into a light-shade image.

In FIG. 16, the code 161 is a binary bit string represented by "1" and "0". The sub image information 162 is an image obtained by converting the code 161 into a binary light-shade image. In the example shown in FIG. 16, the sub image information 162 is image information obtained by setting "0" of the code 161 to correspond to a black pixel (K) and setting "1" of the code 161 to correspond to a white pixel (W) and thus converting the code 161 into two-dimensional light-shade information.

In the present image processing system 1, as shown in FIGS. 1 and 2, the sub-information 102 is embedded in the main image information 101 by the superposition process (step S15 in FIG. 2) of the superposition processing section 34. Therefore, the image size of the sub-information 102 must be equal to or smaller than the size of the main image information 101. If the image size of the sub-information 102 is larger than the image size of the main image information 101, it is necessary to adjust the image size of the sub-information 102.

For example, if the image size of the sub-information 102 obtained by converting a certain code into a light-shade image is larger than the size of the main image information 101, it is possible to adjust the pixel bits of the sub-information 102 in the depth direction (increase the number of bits for each pixel). However, it is not necessary to set the resolution and the number of pixels of the sub-information 102 converted into the light-shade image equal to those of the main image information 101.

In the example shown in FIG. 16, a symbol 163 indicates a case wherein the sub-information 162 is converted into a 2-bit light-shade image. Further, a symbol 164 indicates a case wherein the sub-information 162 is converted into a 3-bit light-shade image. A symbol 165 indicates a case wherein the sub-information 162 is converted into an 8-bit light-shade image.

Next, a first selection/synthesis processing method as the selection/synthesis processing method by the synthesis processing section 33 is explained.

The first selection/synthesis processing method is a method for dividing an area corresponding to one pixel of the sub-information 102 and allocating a plurality of key information items 103 (103a, . . . ) to each divided area. In this example, as indicated by the symbol 165 in FIG. 16, an example of the first selection/synthesis processing method for sub (image) information converted into an 8-bit light-shade image is explained.

FIG. 17 is a diagram showing an example of the correspondence relation between each bit plane corresponding to the number of bits (gradation levels) of the light-shade image as sub-information and a plurality of key information items. FIG. 18 is a view showing nine divided areas 171 to 179 obtained by dividing an area 170 corresponding to one pixel of the sub-information.

In this case, it is assumed that an 8-bit light-shade image is used as the sub-information. Therefore, in the example of FIG. 17, a plurality of key information items allocated to the seventh bit plane to $0^{th}$ bit plane corresponding to eight bits (eight gradation levels) are shown.

In the example of FIG. 17, the first and second key information items are allocated to the seventh bit plane (MSB: Most Significant Bit), the third and fourth key information items are allocated to the sixth bit plane, . . . , the thirteenth and fourteenth key information items are allocated to the first bit plane, and the fifteenth and sixteenth key information items are allocated to the $0^{th}$ bit plane (LSB: Least Significant Bit).

For example, in the example of FIG. 17, if the seventh bit of the sub-information is "0", the first key information is allocated to the seventh bit plane and if the seventh bit of the sub-information is "1", the second key information is allocated to the seventh bit plane. Likewise, key information items are allocated to the respective bit planes according to the values of the respective bits (seventh to $0^{th}$ bits) of the sub-information items.

If the correspondence relation between a plurality of bit planes corresponding to the respective bits of the sub-information items and a plurality of key information items is established as shown in FIG. 17, the result of the selecting/synthesizing process for one pixel of the sub-information can be obtained as shown in FIG. 18, for example, in the first selection/synthesis processing method.

In FIG. 18, it is assumed that an area (a square area of an outer thick frame) 170 corresponds to one pixel of the sub-information. Further, in FIG. 18, it j is assumed that areas 171, 172, 173, 174, 175, 176, 177 and 178 sequentially indicated from the upper left portion respectively correspond to seventh, sixth, fifth, fourth, third, second, first and $0^{th}$ bit planes. In this case, first or second key information (third or fourth key information, . . . , thirteenth or fourteenth key information, fifteenth or sixteenth key information) corresponding to the seventh (sixth, . . . , first, $0^{th}$) bit plane is allocated to the area 171 (172, . . . , 177, 178) shown in FIG. 18.

A bit plane corresponding to an area 179 in the central portion is not present. Therefore, desired information can be allocated to the area 179. For example, dummy key information can be used in the area 179. In the example of FIG. 18, the first or second key information corresponding to the seventh-bit plane is allocated to the area 179 again.

As described above, the area 170 of one pixel of the sub-information having 8-bit light-shade information is divided into the plurality of areas 171 to 179 in the first selection/synthesis processing method. A plurality of key information items corresponding to the bit values of the eight bits indicating the value of the pixel are respectively allocated to the thus divided areas 171, . . . , 178 based on a preset correspondence relation. As a result, image information 170 as shown in FIG. 18 can be formed as the result of the first processing method for one pixel of the sub-information.

When the synthesis processing section 33 of the image processing system 1 performs the first selection/synthesis processing method, the number N of necessary key information items can be given as follows if the bit number of each pixel of sub-information converted into a light-shade image is B.

$$N=2 \cdot B \qquad (B)$$

Therefore, it becomes necessary to use N color-difference amount correcting sections 31 and N color-difference modulating sections 32.

Next, a second selection/synthesis processing method used as the processing method of the selecting/synthesizing process by the synthesis processing section 33 is explained.

The second selection/synthesis processing method is a method for allocating key information items of the same number as the bit number corresponding to one pixel of sub-information. FIG. 19 is a diagram showing an example of the correspondence relation between the number of bits (gradation levels) representing one pixel of sub-information and key information items of the number of bits. FIG. 20 is a view showing an area 180 of one pixel of sub-information as the processing result by the second selection/synthesis processing method.

That is, FIG. 19 is a diagram showing an example of the correspondence relation of 256 key information items with respect to one pixel of sub-information represented by 256 bits. In the example of FIG. 19, 256 key information items corresponding to the respective bits ($0^{th}$ bit to $255^{th}$ bit) of the 256 bits representing one pixel are shown.

Therefore, when a plurality of key information items and representative values of sub-information are related to each other as shown in FIG. 19, the result of the selecting/synthesizing process for one key information selected according to the pixel value of an area of one pixel of sub-information is allocated in the area in the second selection/synthesis processing method as shown in FIG. 20, for example.

That is, in the first selection/synthesis processing method, as shown in FIG. 18, the area of one pixel of sub-information is divided into a plurality of areas and key information is allocated for each area. On the other hand, in the second selection/synthesis processing method, one key information corresponding to the representative value of one pixel of sub-information is selected based on the correspondence relation as shown in FIG. 19 and the thus selected key information is allocated to the pixel. Thus, as the processing result of the second selecting/synthesizing process, image information in which one key information corresponding to the pixel value of one pixel is allocated to the pixel can be obtained as shown in FIG. 20.

When the synthesizing section 33 of the image processing system 1 performs the second selection/synthesis processing method, the number N of necessary key information items can be given as follows if the number of bits indicating a value of each pixel of sub-information converted into a light-shade image is B.

$$N=2^B \qquad (C)$$

In this case, it becomes necessary to use N color-difference amount correcting sections 31 and N color-difference modulating sections 32.

Next, a third selection/synthesis processing method used as the processing method of the selecting/synthesizing process by the synthesis processing section 33 is explained.

The third selection/synthesis processing method is to divide sub-information for each bit plane, convert the thus divided information into a light-shade image and allocate key information. In this case, as indicated by the symbol 165 in FIG. 16, an example of the third selection/synthesis processing method for the sub (image) information converted into an 8-bit light-shade image is explained.

In the third selection/synthesis processing method, for example, as shown in FIG. 16, the sub (image) information converted into an 8-bit light-shade image is divided into a $0^{th}$ bit plane to a seventh bit plane and the seventh bit plane to $0^{th}$ bit plane are repeatedly arranged in order. Further, when the third selection/synthesis processing method is applied, it is necessary to store the arrangement of the seventh bit plane to $0^{th}$ bit plane repeatedly arranged in order so as to use the arrangement in the later restoring process.

Each bit plane is a 1-bit ("0" or "1") light-shade image. Therefore, the light-shade image in which the seventh bit plane to $0^{th}$ bit plane are repeatedly arranged in order finally becomes a 1-bit ("0" or "1") light-shade image. In other words, in the third selection/synthesis processing method, the 8-bit light-shade image is converted into a 1-bit light-shade image. Such a 1-bit light-shade image can be subjected to the selecting/synthesizing process by use of only two key information items. For example, if only the first and second key information items shown in FIG. 17 are used, the first key information is allocated when the light-shade image is "0" and the second key information is allocated when the light-shade image is "1".

Further, the sub-information formed by the third selecting/synthesizing process is restored by using the order in which the seventh bit plane to $0^{th}$ bit plane are repeatedly arranged. That is, the sub-information formed by the third selecting/synthesizing process is restored by performing the procedures of the third selecting/synthesizing process in a reverse direction. Therefore, in the third selecting/synthesizing process, it is necessary to store the order in which the seventh bit plane to $0^{th}$ bit plane are repeatedly arranged so as to restore the sub-information.

When the synthesis processing section 33 of the image processing system performs the third selection/synthesis processing method, the number N of necessary key information items can be given as follows irrespective of the number B of bits for each pixel of sub-information converted into a light-shade image.

$$N=2 \qquad (D)$$

In this case, it becomes necessary to use N color-difference amount correcting sections 31 and N color-difference modulating sections 32.

Next, the superposing process (step S15 of FIG. 2) by the superposition processing section 34 is explained.

In the superposition processing section 34, the superposing process for superposing image information obtained as the processing result by the synthesis processing section 33 on the main image information 101 is performed. The image information obtained as the processing result of the superposing process by the superposition processing section 34 becomes synthesized image information 111. Therefore, the synthesized image information 111 obtained as the processing result of the superposing process by the superposition processing section 34 is set in a state in which the sub-information 102 is embedded in an invisible state in the main image information 101.

In the superposing process, calculating processes are separately performed for three components (R, G, B) configuring the image information by use of the following equations (E-1) to (E-3).

$$DES(i,j)_{-R} = SRC(i,j)_{-R} + RSLT2(i,j)_{-R} \quad \text{(E-1)}$$

$$DES(i,j)_{-G} = SRC(i,j)_{-G} + RSLT2(i,j)_{-G} \quad \text{(E-2)}$$

$$DES(i,j)_{-B} = SRC(i,j)_{-B} + RSLT2(i,j)_{-B} \quad \text{(E-3)}$$

where DES(i,j) indicates synthesized image information, SRC(i,j) indicates main image information and RSLT2(i,j) indicates image information obtained as the processing result of the selecting/synthesizing process.

As described above, in the color-difference modulating process, pattern information of key information is converted into a color-difference information pattern by use of the complementary color relation and replaced by apparently achromatic color information. Further, in the selecting/synthesizing process, sub-information is related to a plurality of key information items. By the above processes, sub-information is related to a plurality of key information items as apparently achromatic color information. The sub-information is image information obtained as the processing result of the selecting/synthesizing process and corresponds to RSLT2(i,j) in the equations (E-1) to (E-3).

In the equations (E-1) to (E-3), RSLT2(i,j) is information whose color difference cannot be identified in a macro fashion to the naked eyes of a human being and which can be observed as an achromatic color. Therefore, as indicated by the following equations (F-1) and (F-2), synthesized image information DES(i,j) looks like main image information SRC(i,j).

$$RSLT2 \approx 0 \quad \text{(F-1)}$$

$$DES \approx SRC \quad \text{(F-2)}$$

In this case, it is assumed that R, G and B components are synthesized.

Next, the electronic watermark embedding process in the image processing system 1 is summarized.

The electronic watermark embedding process in the image processing system 1 mainly has the following features (1) to (3).

(1) Utilizing the Visual Property of a Human Being

The gradation identification ability is lowered as the image frequency becomes higher.

It is more difficult to identify color-difference information than luminance information.

(2) Utilizing the Complementary Color Relation

Red and cyan (=green+blue) is set in a complementary color relation in the case of additive color mixture. Therefore, when red and cyan are set adjacent to each other, the respective colors are difficult to be distinguished by the eyes of a human being and look as an achromatic color as a whole.

(3) Applying the Complementary Color Relation and Color-Difference Information to a High-Frequency Carrier Pattern Image (Color-Difference Modulating Process)

Red-rich pixels and cyan-rich pixels are repeatedly arranged by using the high-frequency carrier pattern image or recording formed synthesized image information with high resolution. Therefore, a fine difference in the color difference cannot be identified by the eyes of a human being and the color-difference amount will be determined as ±0.

By using the features (1) to (3), in the electronic watermark embedding process in the image processing system 1, sub-information can be embedded in an invisible state in main image information without deteriorating the image quality.

The synthesized image information (image information with the electronic watermark embedded therein) formed by the electronic watermark embedding process does not depend on the stored image format. Therefore, the synthesized image information can cope with not only the image format such as BMP, TIFF or JPEG which is now available but also a new image format which will be provided in the future.

Next, the restoring process (step S22) in FIG. 3 is explained.

The sub-information restoring process is a process for extracting a particular spatial frequency component from synthesized image information based on key information used in the electronic watermark embedding process and re-structuring sub-information based on the extracted frequency component.

In the electronic watermark embedding process, a plurality of key information items are used. For example, in the first selection/synthesis processing method, one pixel of sub-information represented by a plurality of bits is divided into a plurality of bit planes and key information items which are related to the respective bit planes are allocated to the bit planes. As shown in FIG. 17, when a plurality of key information items are allocated to each bit plane, sub-information can be restored by use of the first key information in the seventh bit plane. Likewise, sub-information can be restored by use of the fifteenth key information in the $0^{th}$ bit plane. In the following explanation, since the process for each bit plane can be commonly used, key information corresponding to a bit plane to be processed is simply referred to as key information.

Next, the frequency detecting process (step S23) in the restoring process (step S22) is explained. The frequency detecting process (step S23) is a process for extracting a particular spatial frequency component based on the key information.

As a method for extracting a particular spatial frequency component based on the key information, a spatial frequency filter can be used. The coefficient of the spatial frequency filter corresponding to the key information is calculated by the following procedures (1) to (4). It is possible to previously perform the calculation for the coefficient and store the result or calculate the coefficient each time or before the extracting process of the particular spatial frequency component is performed.

(1) The size of the key information is adjusted based on the resolution of synthesized image information input in the image input process (step S21). For example, when the synthesized image information is printed on a recording medium, the resolution of the synthesized image information is determined based on the printing resolution set when the synthesized image information is printed on the recording medium and the reading resolution obtained when the synthesized image information is read from the recording medium.

(2) The Fourier transform is performed to develop the synthesized image information into a frequency region. In this case, the transform may be performed by use of integral numbers, real numbers or complex numbers.

(3) The passage region of the filter is adjusted by referring to the developed value.

(4) A value obtained by subjecting the adjusted value to the inverse Fourier transform is used as a frequency filter coefficient.

The process (1) is explained with reference to FIGS. 21 and 22.

FIG. 21 is a view showing an example of key information. In FIG. 21, a white portion indicates a white pixel (W) and a slant-line portion 192 indicates a black pixel (K). Further, FIG. 22 is a view showing an example of synthesized image information input by the image input process. In FIG. 22, in the case of the color-difference modulating process by use of red-cyan, a white circle 193 indicates a dot which is red component rich and a black circle 194 indicates a dot which is cyan component rich. Further, a waveform 195 indicates a fundamental frequency waveform in the main scanning direction and a waveform 196 indicates a fundamental frequency waveform in the sub-scanning direction.

Figure 22:
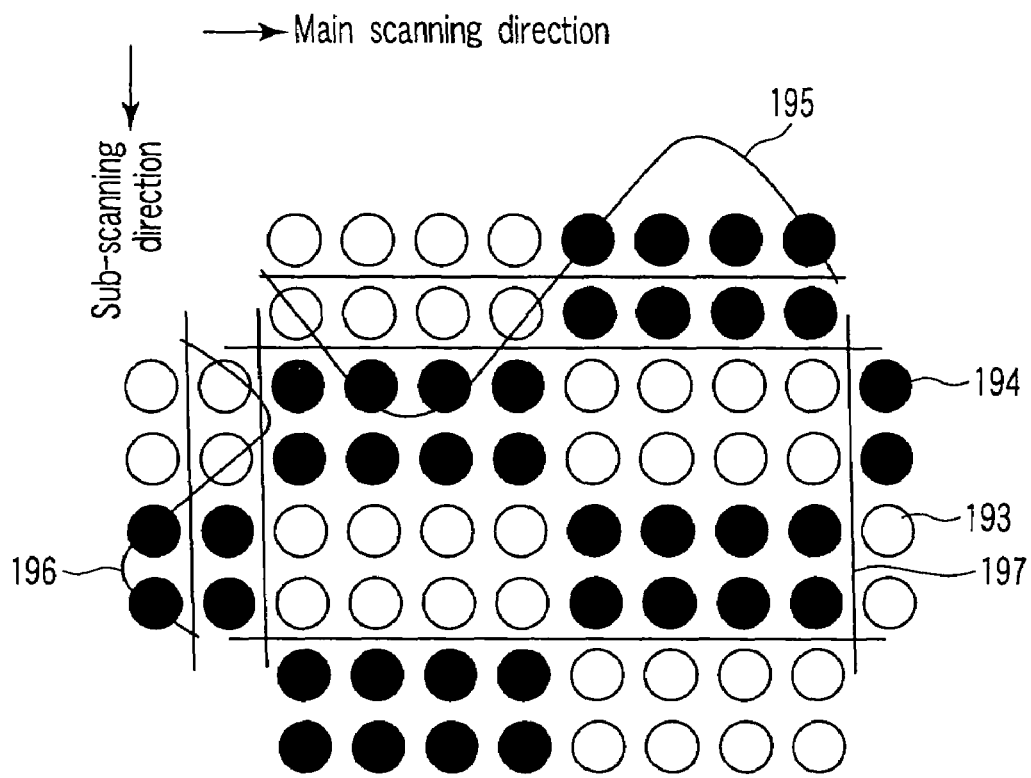
FIG. 22 is a view showing an example of synthesized image information input by the image input process.

For example, when the printing resolution of synthesized image information subjected to the embedding process by use of the key information shown in FIG. 21 is 300 dpi and the reading resolution is 600 dpi, synthesized image information input in the image input process (step S21) is expressed as shown in FIG. 22. In this case, key information embedded in the synthesized image information is converted into a form 197 as shown in FIG. 22. The fundamental frequency of the form 197 is set equivalent to the frequency obtained when the size of key information is expanded by the ratio of the reading resolution to the printing resolution. Therefore, in order to calculate a filter coefficient, variations in the resolution (printing resolution) in the recording process into the recording medium and the resolution (reading resolution from the recording medium) of an input image in the image input process are previously stored.

Next, the processes (2) to (4) are explained.

In the processes (2) to (4), a frequency filter used to extract the spatial frequency component of key information from synthesized image information is designed. The key information is originally binary image information. Therefore, the synthesized image information has a feature that the inclination of an edge (a boundary between the black and white pixels which contact each other) is steep. As the edge is steeper in the spatial region, more harmonics are contained in the frequency region. Therefore, if a frequency filter coefficient calculated by use of synthesized image information having a large number of steep edges is used, noise lying on the harmonic side passes as it is, the S/N ratio is lowered and there occurs a problem in restoring sub-information.

Therefore, the adjusting operation by the process (3) becomes necessary. The contents of the process (3) depend on individual key information items and the operation environment of the system. Generally, in order to suppress noises, occurrence of harmonics is inhibited and only the frequency component lying near the fundamental frequency is permitted to pass. Further, in the environment containing less noise, it is also possible to positively utilize the complexity of key information by passing the harmonics and enhance the degree of security.

In order to extract the spatial frequency component of key information by using the frequency filter coefficient calculated by the above method based on synthesized image information fetched by the image input process, a convolution by the following equation [1] is carried out.

$$K(x, y) = \sum_u \sum_v (g(u, v) \cdot I(x - u, t - v)) \qquad [1]$$

where I denotes synthesized image information fetched by use of recording image input means, g denotes a frequency filter coefficient, and K denotes a spatial frequency component of extracted key information.

The method for extracting the specified spatial frequency component is not limited to the above method using the spatial frequency filter. For example, a method for extracting the specified spatial frequency component by mapping synthesized image information into a space and processing the same by use of a known Fourier transform and wavelet transform and then mapping the thus processed information in reverse can be used.

Next, the re-structuring process (step S24) in the restoring process (step S22) is explained. The re-structuring process (step S24) is a process for re-structuring sub-information based on a spatial frequency component extracted by the frequency detecting process.

In the re-structuring process, sub-information is restored as black and white binary image information by subjecting the extraction result by the frequency detecting process to the binary coding process by use of a preset threshold value Th. That is, in the re-structuring process, sub-information is restored for each bit plane by use of key information items related to the respective bit planes (for example, the correspondence relation shown in FIG. 17) and sub-information items restored based on the respective bit planes are synthesized. Thus, the sub-information embedded is completely restored by use of a plurality of bit planes.

Further, in another restoring method, it is possible to restore sub-information by forming a restoring mask sheet and superposing the restoring mask sheet on synthesized image information which is physically printed on a recording medium. In this case, the sub-information can be visually observed by naked eyes. The restoring mask sheet can be formed by using black pixels of key information used in the bit planes of sub-information which is desired to be restored as recording information, using white pixels thereof as non-recording information, setting the resolution equal to the recording resolution of synthesized image information and recording the information items on a transparent recording medium.

It is important in the restoring method that key information is converted into a color-difference amount of a combination of two colors (for example, red and cyan) set in the complementary color relation and is thus set into apparently achromatic color information. The restoring mask sheet is formed such that the first color of the complementary colors is recorded as black pixels on the transparent recording medium and the second color is set in a non-recording state. Therefore, in the restoring mask sheet, the black pixels corresponding to the first color shield the underlying image and the non-recording pixels corresponding to the second color are transparent and permit the underlying image to be observed. That is, the synthesized image information on which the restoring mask sheet is superposed can be seen in portions corresponding to one of the first and second colors set in the complementary color relation and is shielded and cannot be observed in the remaining portions. In other words, the color balance of the color difference of the synthesized image information on which the restoring mask sheet is superposed is no more maintained and sub-information is deviated from the achromatic color state. Therefore, the sub-information embedded in the synthesized image information can be visually observed.

As described above, in the image processing system of the first embodiment, the color-difference amount of the main image information is corrected by a plurality of color-difference correcting processes and a plurality of color-difference modulating processes are performed based on a plurality of key information items and a plurality of color-difference correction amounts attained by the plurality of color-difference correcting processes. Then, the processing result obtained by the plurality of color-difference modulating processes is subjected to the selecting/synthesizing process based on the sub-information and synthesized image information having the sub-information embedded in an invisible state in the main image information is formed by superposing the processing result of the selecting/synthesizing process on the main image information.

As a result, the synthesized image information having the additional sub-information with plural gradation levels embedded in an invisible state in the main image information can be formed with respect to analog data to be output to a recording medium. Thus, even when the synthesized image information is recorded on the recording medium, the sub-information in the synthesized image information can be maintained. As a result, a recording material with the high degree of security can be formed.

Next, a second embodiment of this invention is explained.

Figure 23:
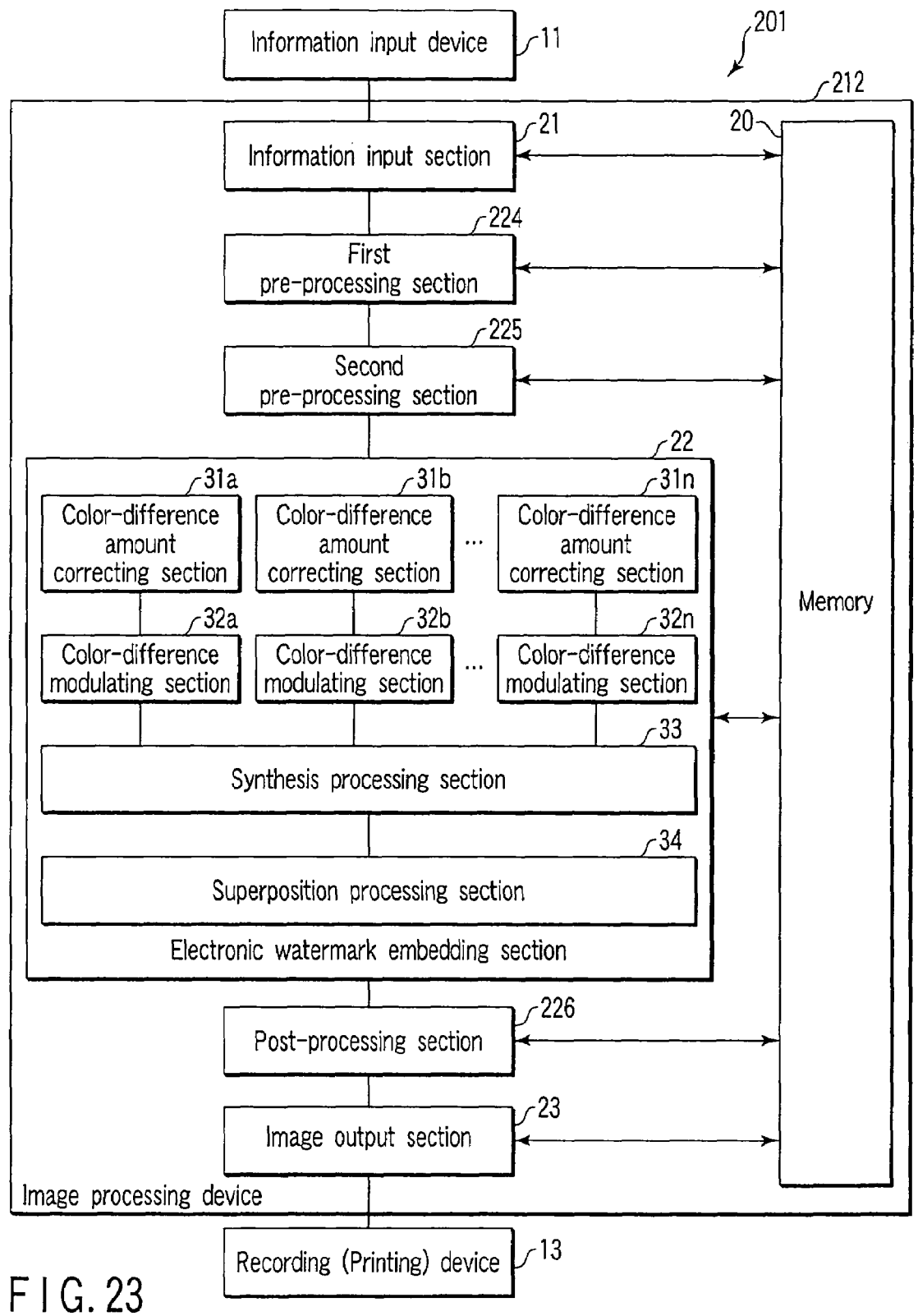
FIG. 23 is a diagram showing an example of the configuration of an image processing system 201 according to a second embodiment of this invention.

FIG. 23 is a diagram showing an example of the configuration of an image processing system 201 according to the second embodiment. Like the image processing system 1 shown in FIG. 1, the image processing system 201 is an apparatus which issues an ID card as a recording material P having a face image for person authentication recorded thereon, for example. In the image processing system 201 shown in FIG. 23, portions which are the same as those of the image processing system 1 shown in FIG. 1 are denoted by the same reference symbols and the explanation thereof is omitted.

As shown in FIG. 23, the image processing system 201 includes an information input device 11 and image processing device 212. Further, as shown in FIG. 23, the image processing device 212 of the image processing system 201 includes a memory 20, information input section 21, first pre-processing section 224, second pre-processing section 225, electronic watermark embedding section 22, post-processing section 226 and image output section 23.

The first pre-processing section 224 performs a first preset pre-process for main image information input from the information input section 21. The first pre-process is explained later in detail. The second pre-processing section 225 performs a second preset pre-process for main image information which is processed by the first pre-processing section 224. The second pre-process is explained later in detail. The post-processing section 226 performs a preset post-process for synthesized image information formed by the electronic watermark embedding section 22. The post-process is explained later in detail. When the image processing device 212 is configured by a PC, the first pre-processing section 224, second pre-processing section 225 and post-processing section 226 are functions realized by executing an application program.

Next, the flow of the process of the image processing system 201 with the above configuration for forming a recording material P on which synthesized image information having sub-information embedded in main image information is recorded is schematically explained.

FIG. 24 is a diagram for illustrating the flow of a process of the image processing system 201 for forming a recording material P on which synthesized image information having sub-information embedded in main image information is recorded. In the process of FIG. 24, portions which are the same as those in the process of FIG. 2 are denoted by the same reference symbols and the detail explanation thereof is omitted.

First, the image processing system 201 performs an information input process for inputting information such as main image information 101, sub-information 102 and a plurality of key information items 103 (103a, 103b, . . . , 103n) used to form an ID card by use of the information input device 11 and information input section 21 (step S10).

When information is input in the information input process, the first pre-processing section 224 performs a first pre-process for the main image information 101 (step S31). The first pre-processing section 224 performs a first pre-process corresponding to an image forming process of the recording process which will be described later for the main image information 101 input in the information input process. In this case, as the first pre-process, for example, a thinning-out (invalidating) process is performed for the main image information 101.

If the first pre-process process is performed for the main image information 101, the second pre-processing section 225 performs a second pre-process for main image information subjected to the first pre-process by the first pre-processing section 224 (step S32). The second pre-process is to perform a geometrical conversion process for the main image information formed by the first pre-process and subjected to the first pre-process. In this example, the second pre-process is to perform a rotating process for the main image information subjected to the first pre-process and remove the pixel portions thinned out in the first pre-process so as to compress the size of the effective pixels, for example. The main image information subjected to the second pre-process is used as embedding-use image information 101' in which the sub-information 102 is embedded.

If the embedding-use image information 101' is formed by the first pre-process and second pre-process, the electronic watermark embedding section 22 performs the electronic watermark embedding process for embedding the sub-information 102 in the embedding-use image information (main image information subjected to the second pre-process) 101' by use of a plurality of key information items 103a to 103n (step S11). As the electronic watermark embedding process, the same process as that explained in the first embodiment is performed (steps S12a to S15). That is, in the electronic watermark embedding process, synthesized image information having the sub-information 102 embedded in an insensible state to eyes of a human being in the embedding-use image information 101' by use of the plurality of key information items 103 is formed.

When the synthesized image information is formed by the electronic watermark embedding section 22, the post-processing section 226 performs a post-process for the synthesized image information formed by the electronic watermark embedding section 22 (step S23). The post-process is a process for converting the synthesized image information into information (recording image information) 231 to be recorded on a recording medium. In this case, the post-process performs an inverse rotating process for the synthesized image information and then adds the pixel portion which has been removed in the second pre-process to expand the effective pixel size.

When the recording image information is formed by the post-processing section 226, the image output section 23 performs an output process for outputting recording image information to the recording device 13 (step S34). When the recording image information is output to the recording device 13, the recording device 13 performs a recording process for recording the recording image information on a recording medium used as a recording material P (step S35).

Next, the recording process in the recording device 13 is explained.

In this example, it is assumed that recording image information output from the image output section 23 to the recording device 13 is color information in which each pixel is expressed by R (red), G (green) or B (blue). If the recording image information is received, the recording device 13 converts R (red), G (green) and B (blue) of each pixel in the image information into C (cyan), M (magenta) and Y (yellow). The color conversion is performed according to the characteristic of the recording device. For example, the color conversion is performed based on a preset set parameter (3×3 color conversion matrix, 3×9 color conversion matrix or look-up table).

If image information of R, G, B is converted into image information of C, M, Y, the recording device 13 forms a control signal to control the recording device. For example, if the recording device 13 is a printer of melting type thermal transfer recording system, the recording device 13 generates a drive pulse signal or drive voltage control signal for a thermal head used as the recording device as a control signal. Further, the recording device 13 performs the heat control operation for the thermal head. When the above processes are completed, the recording device 13 alternately forms even-numbered pixels and odd-numbered pixels for each recording line in the main scanning direction of the thermal head based on the image information converted into C, M, Y for a recording medium. By the above recording process, the recording device 13 records synthesized image information converted into recording image information by the above post-process on a recording medium.

Figure 25:
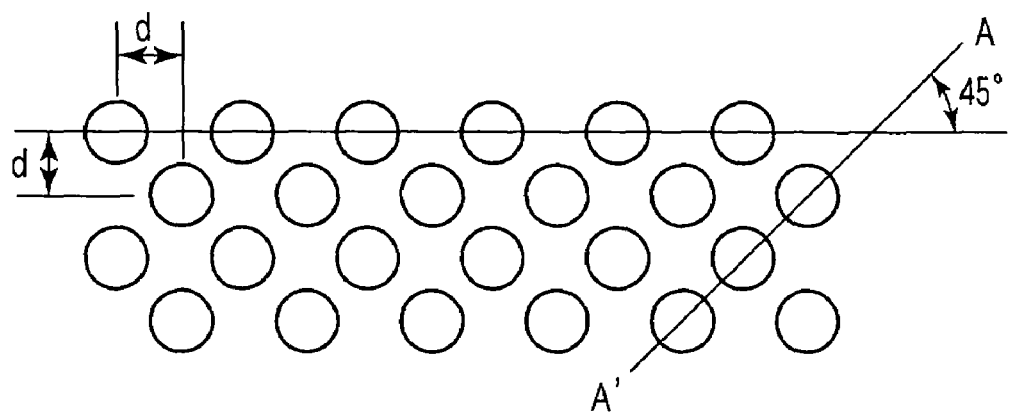
FIG. 25 is a view showing an example of the arrangement of dots formed on a recording medium by the recording device 13.

FIG. 25 is a view showing an example of the arrangement of dots formed on the recording medium by the recording device 13. In the example of FIG. 25, the dots on the A-A' line in FIG. 25 are linearly arranged in a direction of 45° with a pitch d ($1/\sqrt{2}$ of the pitch of heating elements of the thermal head) instead of being arranged on every other dot.

Next, the flow of a process for restoring sub-information from the synthesized image information recorded on the recording medium by the above recording process is explained.

Figure 26:
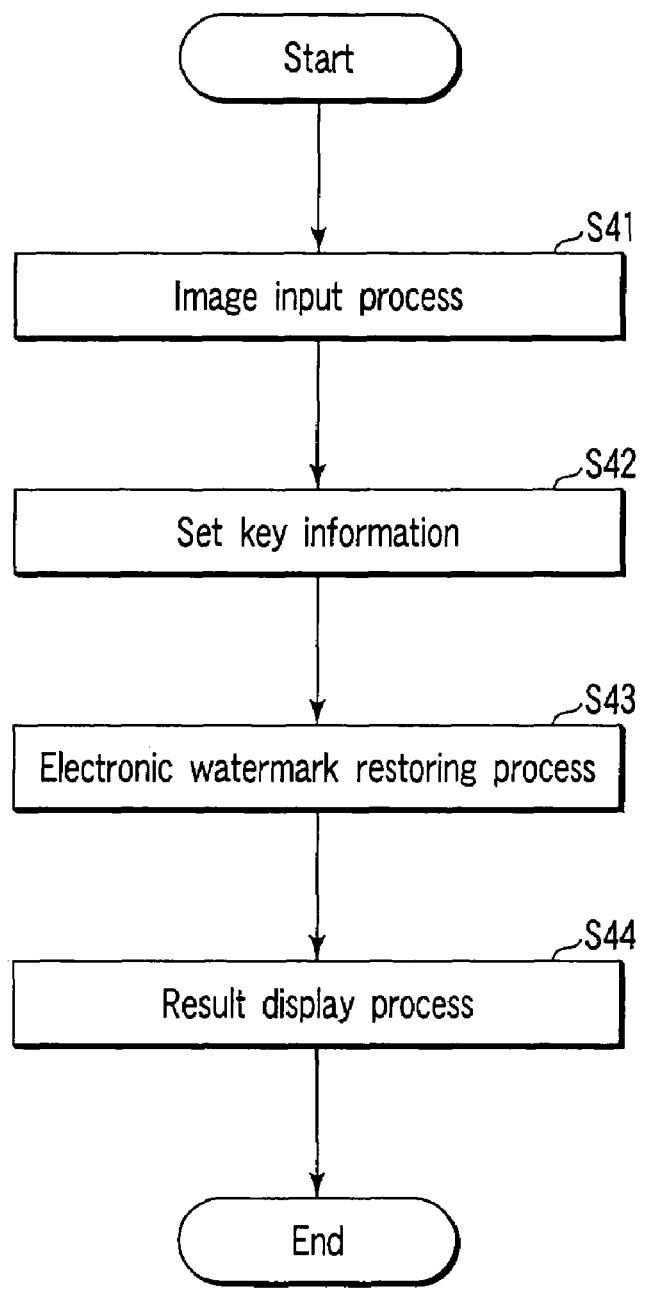
FIG. 26 is a flowchart for illustrating the flow of a process for restoring sub-information.

FIG. 26 is a flowchart for illustrating the flow of the process for restoring sub-information.

The process shown in FIG. 26 is performed by the electronic watermark restoring apparatus. For example, the electronic watermark restoring apparatus is realized by a computer to which an image reading device and display device are connected. In this case, the processes which will be described later are performed by causing the computer to execute various types of processing programs.

As shown in FIG. 26, as the process for restoring an electronic watermark recorded on a recording material P, the electronic watermark restoring apparatus first performs an image input process for inputting synthesized image information recorded on the recording medium P (step S41). The image input process is performed by, for example, permitting the electronic watermark restoring apparatus to optically read synthesized image information recorded on the recording material P by use of an image reading device, convert the thus read information into a digital form and input the digital image information.

When synthesized image information is input by the image input process, the restoring apparatus sets key information used to restore sub-information from the input synthesized image information (step S42). As the key information, key information used in the electronic watermark restoring apparatus is set. Therefore, in the restoring process, it is necessary to specify key information. For example, when a plurality of key information items are separately and selectively used, one of the key information items which is used is determined based on information previously related to the recording material P. Further, when the key information is single key information, information of a specified frequency of the key information may be held in a table in the restoring apparatus and information in the table may be set as the key information setting process.

If image information recorded on the recording material P is input by the image input process, the electronic watermark restoring apparatus performs a restoring process for restoring sub-information as electronic watermark information in the input image information (step S43). The sub-information restoring process may be attained by performing the frequency detecting process and re-structuring process explained in the first embodiment. For example, for frequency filtering by use of a specified frequency of the set key information, the FFT operation or digital frequency filter can be used.

When sub-information is restored by the sub-information restoring process, the electronic watermark restoring apparatus outputs the restored sub-information (step S44). For example, in the electronic watermark restoring apparatus, the restored sub-information is displayed on the display section. As a result, the truth or not of the recording material P can be determined based on the output result of the restored sub-information (for example, sub-information, displayed on the display section). The electronic watermark restoring apparatus may determine the truth or not of the recording material P according to whether or not the restored sub-information coincides with desired sub-information and output the result of determination.

Next, the alternate driving/recording system used in the recording process by the recording device 13 is explained.

In this case, as an application example of the alternate driving/recording system, a melting type thermal transfer recording system which records dots arranged in a zigzag form is explained.

In the melting type thermal transfer recording system, an image is formed according to the presence or not of dots. In the above melting type thermal transfer recording system, when a multi-gradation image is represented, the apparent concentration is controlled by performing an area modulating process for changing the areas of dots. Therefore, in the melting type thermal transfer recording system, it is required to precisely modulate the dot size. Thus, in the melting type thermal transfer recording system, it is preferable to apply the alternate driving/recording system.

FIG. 27 is a diagram showing an example of recording image information items arranged in a grid form. FIG. 28 is a diagram showing an image when the image information shown in FIG. 27 is actually recorded by the alternate driving/recording system.

That is, the alternate driving/recording system alternately drives odd-numbered heating elements of odd-numbered lines of the recording head (line type thermal head) and even-numbered heating elements of even-numbered lines for each recording line. In the above driving system, image information items arranged in a grid form as shown in FIG. 27 are actually arranged in a zigzag form as shown in FIG. 28 and formed as an image on a recording medium. Therefore, in the alternate driving/recording system, even-numbered information items of odd-numbered lines of image information recorded in practice and odd-numbered information items of even-numbered lines thereof are lost.

This means that the sub-information (electronic watermark information) embedded in the synthesized image information is destroyed or modified. That is, in the recording device of the alternate driving system, even if sub-information is simply embedded in an invisible state in image information to be recorded by use of the electronic watermark process, only one half of the area of the original image information becomes effective and the other information is lost. Generally, if the electronic watermark information is destroyed as described above, it becomes extremely difficult to restore the sub-information from the synthesized image information. Therefore, in the recording medium on which the synthesized image information is recorded, the high degree of security cannot be maintained.

In the image processing system 201, the main image information 101 is subjected to the first pre-process by the first pre-processing section 224 and the second pre-process by the second pre-processing section 225 to form an embedding-use image 101' before the electronic watermark embedding process by the electronic watermark embedding section 22 is performed. Further, in the image processing section 201, a post-process by the post-processing section 226 is performed after the electronic watermark embedding process is performed by the electronic watermark embedding section 22. Thus, in the image processing system 201, the electronic watermark is prevented from being destroyed at the alternate driving/recording time.

Next, the first and second pre-processes are explained.

In the first pre-processing section 224, image information corresponding to pixels to which energy is not applied is thinned out in the case of the alternate driving/recording system as the first pre-process. FIG. 29 is a diagram showing an example of the arrangement of whole image information items to be recorded. In the example of FIG. 29, each black portion 251 corresponds to a pixel to be recorded (information which is not thinned out) and each white portion 252 corresponds to a pixel not to be recorded (information which is thinned out).

In the second pre-processing section 225, a rotating process for the arrangement of the image information subjected to the first pre-process and a process for removing thinned-out information are performed as the second pre-process. Then, a compression process for compressing the image information to the effective image information size is performed. FIG. 30 is a diagram showing a state in which the image information shown in FIG. 29 is rotated by 45°. As shown in FIG. 30, if the image information shown in FIG. 29 is rotated by 45°, the black portions 251 (information items which are not thinned out) are linearly arranged. In the second pre-process, the white portions 252 (information items which are thinned out) shown in FIG. 30 are removed and re-arranged. Thus, embedding-use image information 101' including only image information that is not influenced by the alternate driving/recording system is formed.

Further, the first and second pre-processes are explained in detail by using a concrete example.

Figures 31, 32, 33, 34:
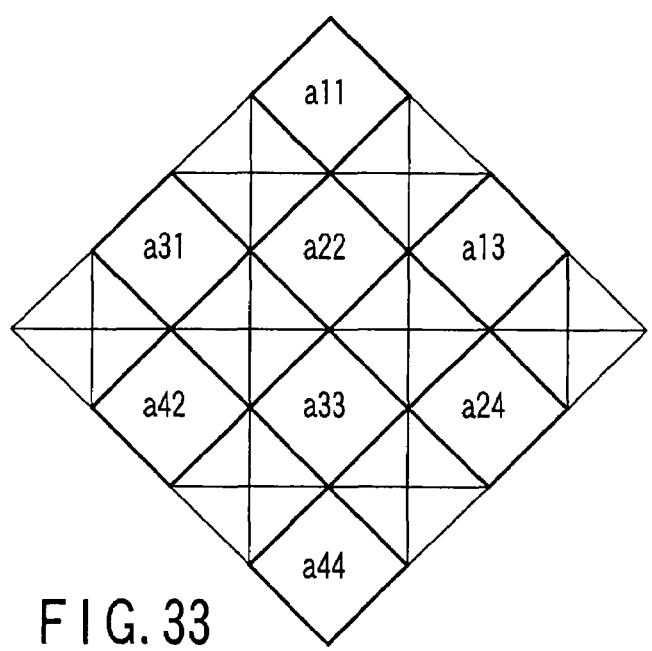
FIG. 31 is a diagram showing an example of the arrangement of image information such as main image information to be recorded.
FIG. 32 is a diagram showing a state in which the image information of FIG. 31 is subjected to a first pre-processing operation.
FIG. 33 is a diagram showing image information in a state in which the image information set in the state of FIG. 32 is rotated by 45°.
FIG. 34 is a diagram showing image information attained by re-arranging pixels of effective image information in the image information set in the state of FIG. 33.

FIG. 31 is a diagram showing an example of the arrangement of image information such as main image information to be recorded. FIG. 32 is a diagram showing a state in which the image information of FIG. 31 is subjected to the first pre-process. FIGS. 33 and 34 are diagrams each showing a state of image information in a corresponding step of the second pre-process. FIG. 33 is a diagram showing image information set in a state in which the image information set in the state of FIG. 32 is rotated by 45°. FIG. 34 is a diagram showing image information attained by re-arranging pixels of effective image information in the image information set in the state of FIG. 33.

Image information shown in FIG. 31 is configured by $4 \times 4 = 16$ pixels aij (i=1 to 4, J=1 to 4). In the first pre-process by the first pre-processing section 224, even-numbered pixels of odd-numbered lines and odd-numbered pixels of even-numbered lines in the image information to be processed are thinned out. For example, if image information shown in FIG. 31 is given, the first pre-processing section 224 removes pixels having an x mark as shown in FIG. 32 (even-numbered pixels of odd-numbered lines and odd-numbered pixels of even-numbered lines).

Further, in the second pre-processing section 225, first, a rotating process is performed for image information subjected to the first pre-process by the first pre-processing section 224. For example, if image information shown in FIG. 32 is given as the result of the first pre-process, the second pre-processing section 225 subjects the image information to the rotating process of 45° as shown in FIG. 33. Further, the second pre-processing section 225 re-arranges the effective pixels in the image information subjected to the rotating process to form image information having the same size as that of the original image information.

For example, if image information as shown in FIG. 33 is obtained as the result of the rotating process, the second pre-processing section 225 re-arranges pixels of the effective image information other than portions having the x mark shown in FIG. 33 as shown in FIG. 34. Then, it stores pixel values (in this case, "0") as information indicating no recording in arrangement pixels of vacant spaces.

Further, in image information subjected to the first and second pre-processes, an area of the effective pixels is subjected to the electronic watermark embedding process by the electronic watermark embedding section 22. For example, if the image information shown in FIG. 34 is obtained by the first and second pre-processes, the electronic watermark embedding section 22 performs the electronic watermark embedding process for the pixels in the area surrounded by the thick line as shown in FIG. 34.

After the electronic watermark embedding process, the post-processing section 226 performs the post-process for image information in which the electronic watermark is embedded. The post-process by the post-processing section 226 performs a process which is set in a reverse direction with respect to the second pre-process. For example, when the image information as shown in FIG. 34 which is obtained by the first and second pre-processes is subjected to the electronic watermark embedding process, the post-processing section 226 subjects the image information to a conversion process so as to set the arrangement of the effective pixels (pixels in the area surrounded by the thick line in FIG. 34) of the image information to the arrangement shown in FIG. 33.

Further, it rotates the image information subjected to the conversion process by 45° in a direction opposite to that in the second pre-process. Image information obtained by the post-process is output as recording image information to the recording device 13 from the image output section 23.

As a result, even if the recording device 13 is of the alternate driving/recording system, information configured by the pixels (pixels in which sub-information is embedded) in the area surrounded by the thick line shown in FIG. 34 is completely printed on a recording medium. That is, according to the above process, pixels having sub-information embedded therein are actually recorded on the recording medium and completely held even in the case of alternate driving/recording system. As a result, sub-information embedded in the above process is not influenced by the alternate driving/recording process and the sub-information is not destroyed or modified.

The image processing operation is not limited to the image processing system having a recording apparatus of the melting type thermal transfer recording system, but can be applied to an image processing system having a recording apparatus of a recording system for making gradation representation by modulation of dot areas of recording pixels.

Next, the procedure of the image processing system 201 according to the second embodiment is explained.

Figure 35:
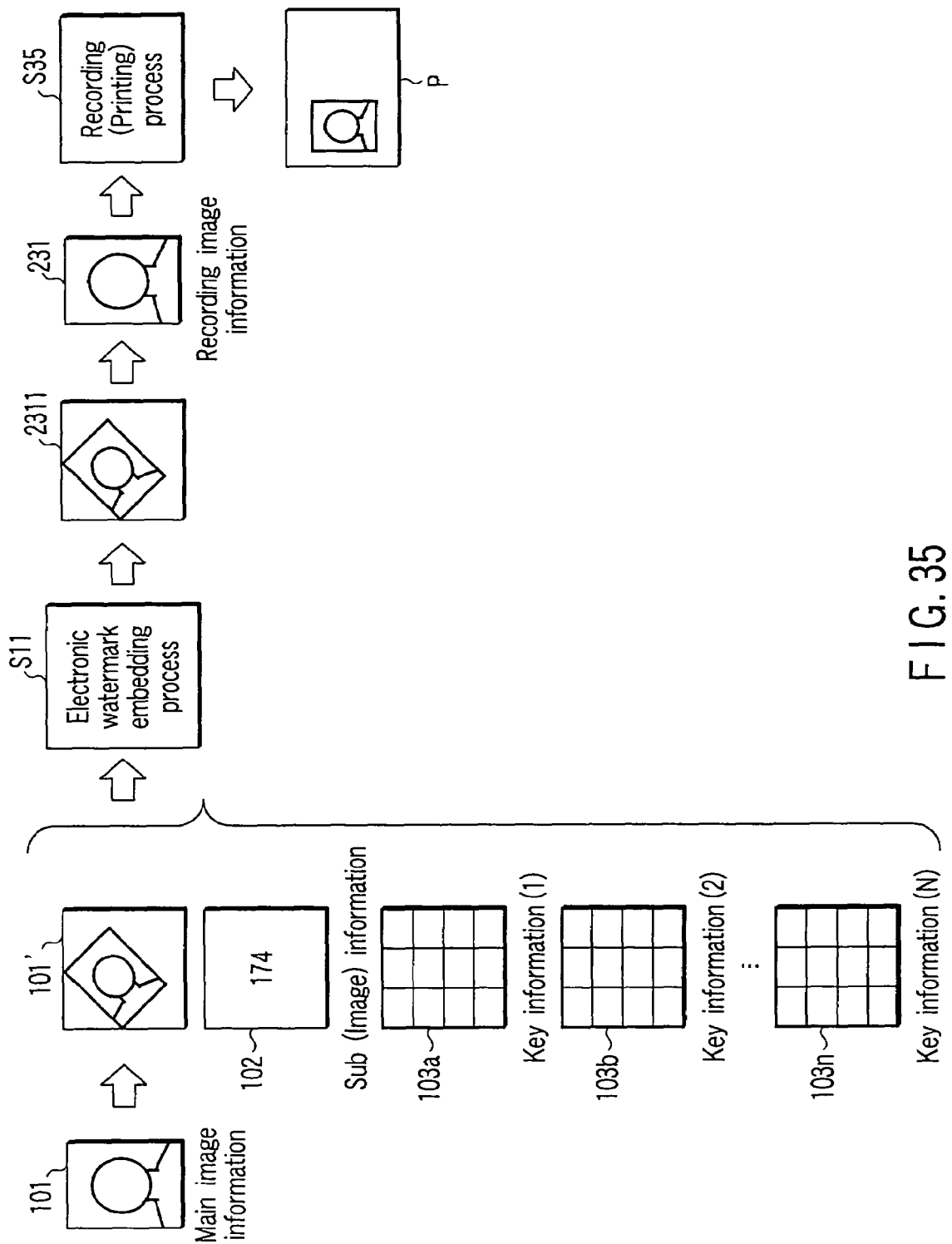
FIG. 35 is a diagram for illustrating the whole processing procedure of the image processing system 201.

FIG. 35 is a diagram for illustrating an example of the whole processing procedure of the image processing system 201.

In the example of FIG. 35, for example, main image information 101 is face image information for person authentication. For example, sub-information 102 is information (in this example, a numeral "174") which is used to enhance the degree of security of the main image information 101. Further, as the sub-information 102, an image obtained by coding a name and date of birth or a pattern of a logo mark of a company can be used. A plurality of key information items 103a to 103n are used to embed the sub-information 102 in the main image information 101. Further, the key information items 103a to 103n are also used as information items for restoring the sub-information embedded in an invisible state from the synthesized image information recorded on a recording medium.

In the image processing system 201, first, the main image information 101, sub-information 102 and a plurality of key information items 103a to 103n are input by means of the information input section 21. When the main image information 101 is input by use of the information input section 21, the first pre-processing section 224 and second pre-processing section 225 perform the first and second pre-processes for the main image information 101 to form embedding-use image information 101'. If the embedding-use image information 101' is formed, the electronic watermark embedding section 22 performs the electronic watermark embedding process by use of the embedding-use image information 101', sub-information 102 and a plurality of key information items 103a to 103n. When image information 231' having the sub-information 102 embedded in the embedding-use image information 101' is formed by use of the plurality of key information items 103a to 103n in the electronic watermark embedding process, the post-processing section 226 performs the post-process as the inverse transform process with respect to the second pre-process for the image information 231'. As a result, recording image information 231 as the synthesized image information having the sub-information 102 embedded therein in an invisible state is formed. When the recording image information 231 is formed by the post-process, the recording image information 231 is output to the recording device 13 from the information output section. When the recording image information 231 is received, the recording device 13 performs the recording process to record the recording image information 231 as the synthesized image information having the sub-information 102 embedded therein in the invisible state on a recording medium by the alternate driving system. By the recording process, a recording material P is completed.

As described above, in the image processing system according to the second embodiment, sub-information is embedded in main image information subjected to the pre-process by use of a plurality of key information items and the thus obtained image information is post-processed and recorded on a recording medium. As a result, in addition to the effect explained in the first embodiment, an effect that destruction and modification of sub-information at the time of recording on the recording medium can be prevented can be attained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus which forms synthesized image information having sub-information embedded in an invisible state in main image information, comprising:
   a plurality of color-difference amount correction processing sections which subject main image information to color-difference correction processes by use of color-difference amounts previously set therein,
   a plurality of color-difference modulation processing sections which correspond in number to the color-difference amount correction processing sections and perform color-difference modulating processes based on a plurality of key information items and a plurality of color-difference amounts corrected by the plurality of color-difference amount correction processing sections,
   wherein each key information is image information configured by black and white pixels,
   wherein each color-difference modulation processing section allocates first and second colors set in a complementary color relation to white and black pixels of the key information, respectively,
   a synthesis processing section which selects a plurality of image information items subjected to color-difference modulation by the plurality of color-difference modulation processing sections based on the sub-information and synthesizes the selected image information items,
   wherein the synthesis processing section performs a selecting and synthesizing process to set the number of connecting pixels of the first color and connecting pixels of the second color to a minimum number in image information obtained by selecting and synthesizing a plurality of image information items subjected to color-difference modulation by the plurality of color-difference modulation processing sections, and
   a superposition processing section which superposes image information as sub-information synthesized by the synthesis processing section on the main image information.

2. The image processing apparatus according to claim 1, wherein the synthesis processing section performs a synthesizing process by selectively performing one of a rotation process, vertically inverting process and laterally inverting process for a plurality of image information items subjected to color-difference modulation by the plurality of color-difference modulation processing sections to set the number of connecting pixels of the first color and connecting pixels of the second color to a minimum number in image information obtained by selecting and synthesizing a plurality of image information items subjected to dolor-difference modulation by the plurality of color-difference modulation processing sections.

3. An image processing apparatus, which forms synthesized image information having sub-information embedded in an invisible state in main image information, comprising:

a plurality of color-difference amount correction processing sections which subject main image information to color-difference correction processes by use of color-difference amounts previously set therein, a plurality of color-difference modulation processing sections which correspond in number to the color-difference amount correction processing sections and perform color-difference modulating processes based on a plurality of key information items and a plurality of color-difference amounts corrected by the plurality of color-difference amount correction processing sections, a synthesis processing section which selects a plurality of image information items subjected to color-difference modulation by the plurality of color-difference modulation processing sections based on the sub-information and synthesizes the selected image information items, a superposition processing section which superposes image information as sub-information synthesized by the synthesis processing section on the main image information, a recording section which records synthesized image information obtained by superposing image information as sub-information on the main image information by the superposition processing section on a recording medium, a first pre-processing section which performs a first pre-process for main image information which corresponds to a pixel forming process for forming pixels used when the recording section records the synthesized image information on a recording medium, and a second pre-processing section which performs a second pre-process for the main image information subjected to the first pre-process by the first pre-processing section, wherein the plurality of color-difference amount correction processing sections perform the color-difference correction processes for image information as an embedding-use image subjected to the second pre-process by the second pre-processing section by use of color-difference amounts previously set therein.

4. The image processing apparatus according to claim 3, further comprising an inverse transformation section which performs an inverse transformation process of the second pre-process by the second pre-processing section for synthesized image information obtained by superposing image information as sub-information on the main image information by the superposition processing section, wherein the recording section records synthesized image information subjected to the inverse transformation process by the inverse transformation section on a recording medium by use of an alternate driving/recording system which alternately forms even-numbered pixels and odd-numbered pixels in a main scanning direction for each recording line.

5. The image processing apparatus according to claim 3, wherein the first pre-processing section performs a process for thinning out main image information in correspondence to the pixel forming process of the recording section.

6. The image processing apparatus according to claim 3, wherein the second pre-processing section performs a process for rotating the main image information subjected to the thinning-out process by the first pre-processing section by a preset angle and compressing and re-structuring an effective portion of main image information obtained by removing a thinned-out portion from the main image information.

7. The image processing apparatus according to claim 3, further comprising an inverse transformation section which expands and re-structures an effective portion of the synthesized image information by inserting non-recording information corresponding to a thinned-out portion of the main image information into the synthesized image information and inversely rotates the information by a preset angle to perform an inverse transformation, process of the second pre-process by the second pre-processing section, wherein the recording section records synthesized image information subjected to the inverse transformation process by the inverse transformation section on a recording medium by use of an alternate driving/recording system which alternately forms even-numbered pixels and odd-numbered pixels in a main scanning direction for each recording line.

8. An image processing method which forms synthesized image information having sub-information embedded in an invisible state in main image information, comprising:

performing a plurality of color-difference correction processes with respect to main image information by use of color-difference amounts previously set therein, performing color-difference modulation processes which correspond in number to the color-difference amount correction processes based on a plurality of key information items and a plurality of color-difference amounts corrected by the plurality of color-difference amount correction processes, wherein each key information is image information configured by white and black pixels, wherein each color-difference modulation process is performed to allocate first and second colors set in a complementary color relation in correspondence to white and black pixels of each key information, performing a selection/synthesis process which selects a plurality of image information items subjected to color-difference modulation by the plurality of color-difference modulation processes based on the sub-information and synthesizes the selected image information item, wherein the selecting/synthesizing process is performed to set the number of connecting pixels of the first color and connecting pixels of the second color to a minimum number in image information obtained by selecting and synthesizing a plurality of image information items subjected to color-difference modulation by the plurality of color-difference modulation processes, and superposing image information as sub-information synthesized by the selection/synthesis process on the main image information.

9. The image processing method according to claim 8, wherein the selecting/synthesizing process is performed by selectively performing one of a rotation process, vertically inverting process and laterally inverting process for a plurality of image information items subjected to color-difference modulation by the plurality of color-difference modulation processes to set the number of connecting pixels of the first color and connecting pixels of the second color to a minimum number in image information obtained by selecting and synthesizing a plurality of image information items subjected to color-difference modulation by the plurality of color-difference modulation processes.

10. An image processing method which forms synthesized image information having sub-information embedded in an invisible state in main image information, comprising:

performing a plurality of color-difference correction processes with respect to main image information by use of color-difference amounts previously set therein, performing color-difference modulation processes which correspond in number to the color-difference amount correction processes based on a plurality of key information items and a plurality of color-difference amounts corrected by the plurality of color-difference amount correction processes, performing a selection/synthesis process which selects a plurality of image information items subjected to color-difference modulation by the plurality of color-difference modulation processes based on the sub-information and synthesizes the selected image information items, superposing image information as sub-information synthesized by the selection/synthesis process on the main image information, recording the synthesized image information obtained by superposing the image information as sub-information on the main image information on a recording medium by use of a recording device, performing a first pre-process for main image information which corresponds to a pixel forming process for forming pixels used when the recording device records the synthesized image information on a recording medium, and performing a second pre-process for the main image information subjected to the first pre-process, wherein the plurality of color-difference amount correcting processes perform the color-difference amount correction processes for image information as an embedding-use image subjected to the second pre-process by use of previously set color-difference amounts.

11. The image processing method according to claim 10, further comprising an inverse transformation process of the second pre-process for synthesized image information obtained by superposing image information as sub-information on the main image information, wherein the recording is to record synthesized image information subjected to the inverse transformation process on a recording medium by use of an alternate driving/recording system which alternately forms even-numbered pixels and odd-numbered pixels in a main scanning direction for each recording line.

12. The image processing method according to claim 10, wherein the first pre-process includes a process for thinning out main image information according to the pixel forming process of the recording device.

13. The image processing method according to claim 10, wherein the second pre-process includes a process for rotating the main image information subjected to the thinning-out process by the first pre-process by a preset angle and compressing and re-structuring an effective portion of main image information obtained by removing a thinned-out portion from the main image information.

14. The image processing method according to claim 10, further comprising expanding and re-structuring an effective portion of the synthesized image information by inserting non-recording information corresponding to a thinned-out portion of the main image information into the synthesized image information and inversely rotating the thus obtained information by a preset angle to perform an inverse transformation process of the second pre-process, wherein the recording is to record synthesized image information subjected to the inverse transformation process on a recording medium by use of an alternate driving/recording system which alternately forms even-numbered pixels and odd-numbered pixels in a main canning direction for each recording line.

* * * * *